US011335379B2

(12) United States Patent
Zhang et al.

(10) Patent No.: US 11,335,379 B2
(45) Date of Patent: May 17, 2022

(54) VIDEO PROCESSING METHOD, DEVICE AND ELECTRONIC EQUIPMENT

(71) Applicant: New Oriental Education & Technology Group Inc., Beijing (CN)

(72) Inventors: Jun Zhang, Beijing (CN); Wei Qu, Beijing (CN); Yuying Ding, Beijing (CN)

(73) Assignee: New Oriental Education & Technology Group Inc., Beijing (CN)

( * ) Notice: Subject to any disclaimer, the term of this patent is extended or adjusted under 35 U.S.C. 154(b) by 0 days.

(21) Appl. No.: 16/850,239

(22) Filed: Apr. 16, 2020

(65) Prior Publication Data
US 2021/0090608 A1    Mar. 25, 2021

(30) Foreign Application Priority Data
Sep. 25, 2019    (CN) .......................... 201910910748.8

(51) Int. Cl.
| | |
|---|---|
| *G11B 27/031* | (2006.01) |
| *G06K 9/00* | (2006.01) |
| *G06T 3/40* | (2006.01) |
| *G06T 5/00* | (2006.01) |
| *G06T 7/73* | (2017.01) |
| *H04N 5/262* | (2006.01) |
| *G06K 9/32* | (2006.01) |
| *G08B 13/196* | (2006.01) |

(52) U.S. Cl.
CPC ........ *G11B 27/031* (2013.01); *G06K 9/00228* (2013.01); *G06K 9/00335* (2013.01); *G06K 9/00718* (2013.01); *G06T 3/4053* (2013.01); *G06T 5/002* (2013.01); *G06T 7/73* (2017.01); *H04N 5/2628* (2013.01); *G06T 2207/10016* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 10,027,726 B1* | 7/2018 | Ozog | .................... H04L 67/306 |
| 2015/0279426 A1* | 10/2015 | Maurer | ................... G11B 27/28 |
| | | | 386/241 |
| 2016/0239711 A1* | 8/2016 | Gong | ................. G06K 9/00751 |

(Continued)

FOREIGN PATENT DOCUMENTS

| | | |
|---|---|---|
| CN | 107483843 A | 12/2017 |
| CN | 109788215 A | 5/2019 |

*Primary Examiner* — Hung Q Dang
(74) *Attorney, Agent, or Firm* — Loeb & Loeb LLP

(57) ABSTRACT

Provided a video processing method, a device and electronic equipment, which can process a video including multiple human body objects to obtain a plot video segment for any one of the multiple human body objects. The embodiments of the present application can carry out pertinent observations on the human body objects and improve the sensory experience of video viewers. The video processing method includes obtaining a first video including multiple human body objects; determining a detection region of a first object among the multiple human body objects according to at least one image frame of the first video; performing human behavior feature detection on the detection region of the first object in the first video to obtain a first plot video segment of the first object in the first video.

19 Claims, 19 Drawing Sheets

(56) References Cited

U.S. PATENT DOCUMENTS

| | | | |
|---|---|---|---|
| 2017/0221371 A1* | 8/2017 | Yang | G06T 19/006 |
| 2018/0025078 A1* | 1/2018 | Quennesson | G06F 16/00 |
| | | | 725/141 |
| 2019/0114487 A1* | 4/2019 | Vijayanarasimhan | |
| | | | G06K 9/00751 |
| 2019/0147598 A1* | 5/2019 | Sawai | G06T 11/40 |
| | | | 382/283 |

* cited by examiner (a) (b)

(c) (d)

VIDEO PROCESSING METHOD, DEVICE AND ELECTRONIC EQUIPMENT

CROSS-REFERENCE TO RELATED APPLICATION

The present application claims priority to Chinese Patent Application No. 201910910748.8, filed on Sep. 25, 2019, the disclosure of which is incorporated herein by reference in its entirety as part of the present application.

TECHNICAL FIELD

The present application relates to a field of video technology, and more particularly, relates to a video processing method, device and electronic equipment.

BACKGROUND

Nowadays, with the development of information technology, the forms of teaching students include online live classes, recorded classes, traditional face-to-face classes, and the like. Among them, face-to-face classes can create a better learning atmosphere, it is easier for students to concentrate their attentions, and students may interact with teachers more directly. Thus, students would have better learning outcomes. But for parents, they cannot participate in most of the face-to-face classes. Even if classrooms are equipped with cameras, those cameras can only capture pictures with all students in them. Besides, due to the cost of cameras, most cameras are susceptible to ambient light, the quality of the captured video images is poor, and it is not possible to clearly present each student's performance in the classroom to his/her parent. Therefore, parents cannot grasp the learning process, attitude and actual results of students in a targeted manner, and it is difficult to make a targeted investigation on the learning outcomes and to adjust the curriculum strategy according to the interests of students.

Therefore, how to present student video images with better quality to parents is a technical problem to be solved urgently.

SUMMARY

According to embodiments of the present application, there is provided a video processing method, a device and electronic equipment, which can process a video including multiple human body objects to obtain a plot video segment for any one of the multiple human body objects. The embodiments of the present application can carry out pertinent observations on the human body objects and improve the sensory experience of video viewers.

In a first aspect, a video processing method is provided. The video processing method includes: obtaining a first video including multiple human body objects; determining a detection region of a first object among the multiple human body objects according to at least one image frame of the first video; performing human behavior feature detection on the detection region of the first object in the first video to obtain a first plot video segment of the first object in the first video.

According to the video processing methods of the embodiments of the application, optimized processing mode of a plot video segment is determined according to face detection, so that a video image optimization can be better performed on face regions in a video, to form a better video with a better viewing effect.

According to the video processing methods of the embodiments of the present application, background blurring and super-resolution reconstruction for faces are performed based on the face region obtained by face detection to realize lens blurring processing, and a simulated spotlight effect can follow the face through light-mapping. The face region of the first object in the lens video segment can be highlighted in both ways, and the video quality and the user perception experience are improved.

In a second aspect, a video processing device is provided. The device includes means for performing steps in the methods of the above-described first aspect and the implementations of the first aspect.

In a third aspect, electronic equipment is provided. The electronic equipment includes a memory for storing a computer program and a processor for calling and running the computer program from the memory, to enable the electronic equipment to perform the methods in the first aspect and any of the possible implementations of the first aspect.

In a fourth aspect, a non-volatile computer-readable storage medium is provided. The non-volatile computer-readable storage medium stores a program that causes the electronic equipment to perform the method in the first aspect or any one of the possible implementations of the first aspect.

DETAILED DESCRIPTION

Hereinafter, the technical scheme in the embodiments of the present application will be described with reference to the drawings.

It should be understood that the specific examples herein are only to help those skilled in the art to better understand the embodiments of the present application, and are not intended to limit the scope of the embodiments of the present application.

It should also be understood that in various embodiments of the present application, the sequence number of each process does not mean the sequence of execution, and the execution sequence of each process should be determined by its function and internal logic, and should not make any limitation on the implementation process of the embodiments of the present application.

It should also be understood that the various embodiments described in this specification can be implemented separately or in combination, and the embodiments of the present application are not limited thereto.

Unless otherwise specified, all technical and scientific terms used in the embodiments of the present application have the same meaning as commonly understood by those skilled in the art of the present application. The terminology used in the present application is just for the purpose of describing specific embodiments and is not intended to limit the scope of the present application. As used herein, the term "and/or" includes any and all combinations of one or more related listed items.

First, the logical structure of electronic equipment capable of performing a video processing method provided by the embodiments of the present application is introduced.

Figure 1:
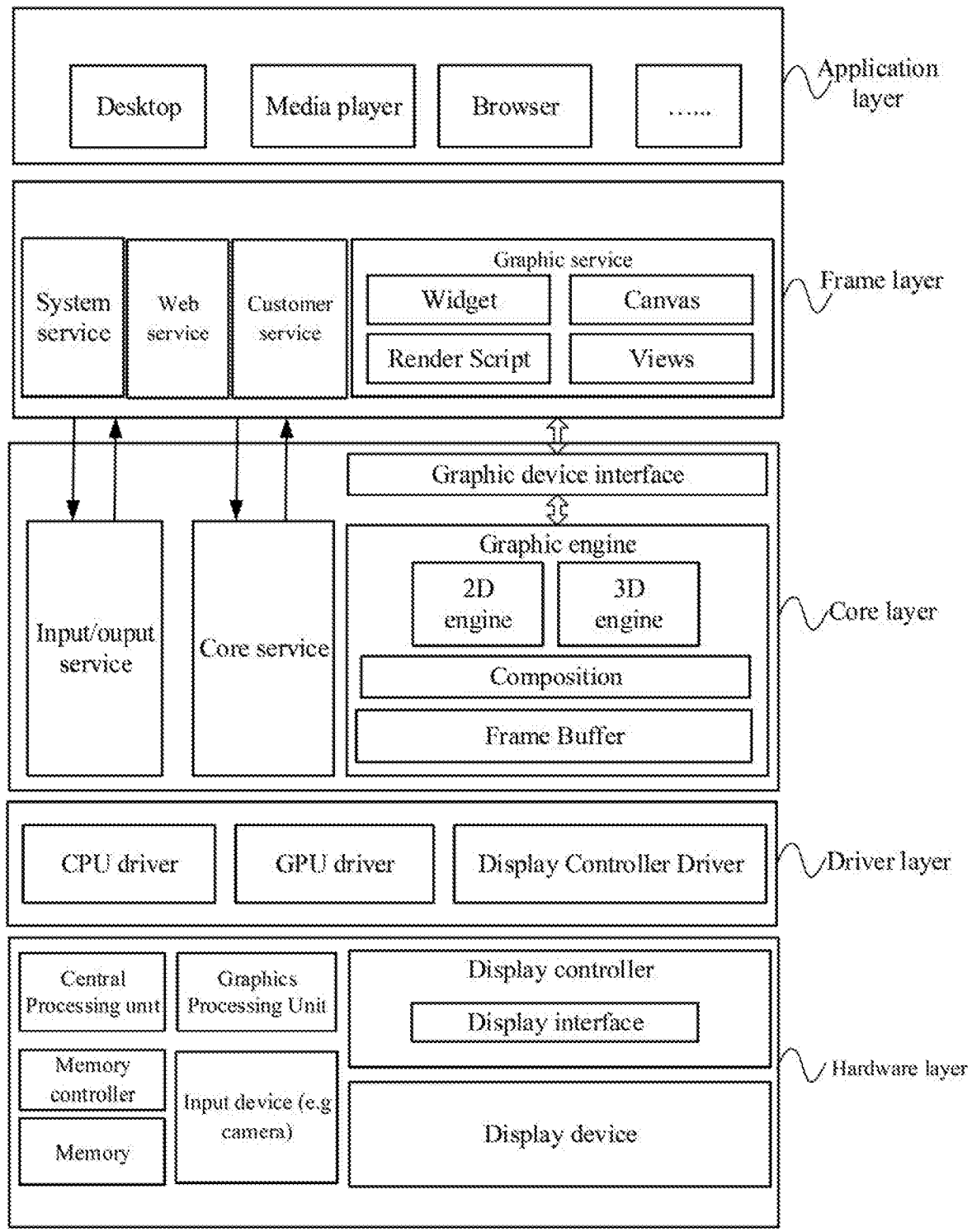
FIG. 1 is a logical block diagram of an example of electronic equipment capable of performing the video processing method according to the embodiments of the present application.

As shown in FIG. 1, a hardware layer of the electronic equipment includes a Central Processing Unit (CPU) and/or a Graphics Processing Unit (GPU), etc.

Optionally, the hardware layer of the electronic equipment may also include a storage device, an input/output device, a memory, a memory controller, a network interface, etc.

Therein, the input device may include sensors, such as visual sensors (cameras, video cameras, infrared sensors, etc.) for generating video data to be processed.

In addition, the input device may further include means for detecting a user operation and generating user operation information for indicating the user operation, which may include, as an example without any limitation, a keyboard, a mouse, a touch screen, etc.

The output device may be used to present visual information such as a user interface, an image, or a video. As an example without any limitation, the output device may include a display device such as a liquid crystal display (LCD), a cathode ray tube (CRT) display, a holographic display, or a Projector, etc.

Operating systems (such as Windows, Linux, Android, etc.) and some application programs can be run on the hardware layer. A core library is the core part of the operating system, including input/output services, core services, a graphics device interface, and a graphics engine for CPU and GPU graphics processing. The graphics engine may include a 2D engine, a 3D engine, a composition, a frame buffer, etc. In addition, the electronic equipment also includes a driving layer, a frame layer, and an application layer. The driving layer may include a CPU driver, a GPU driver, and a display controller driver, etc. The framework layer may include graphic services, system services, web services, customer services, etc. Graphics services may include widgets, canvas, views, render scripts, etc. The application layer may include a launcher, a media player, a browser, etc.

Taking FIG. 1 as an example, the video processing methods provided by the embodiments of the present application is applied to the electronic equipment. The hardware layer of the electronic equipment may include hardware such as a processor (e.g., CPU and/or GPU), a display controller, a memory, a memory controller, an input device (or user operation detection device), a display device, and the like. A kernel library layer may include Input/Output Service (I/O Service), a kernel service and a graphic engine.

Figure 2:
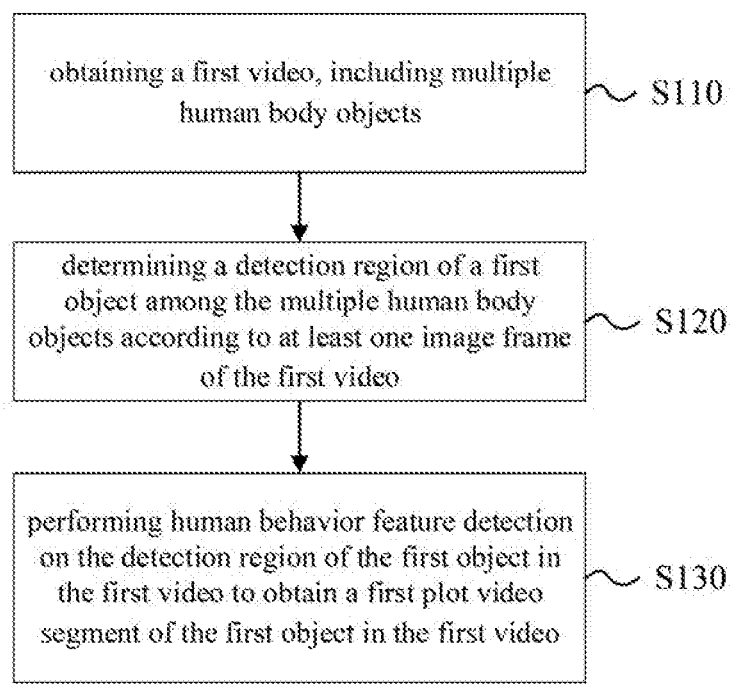
FIG. 2 is a schematic flow chart of a video processing method according to an embodiment of the present application.

FIG. 2 shows a schematic flow chart of a video processing method 100 of the embodiments of the present application performed by a server (an example of electronic equipment).

As shown in FIG. 2, the video processing method 100 comprises steps S110-S130.

At step S110, a first video including multiple human body objects is obtained.

As an example without any limitation, the first video received by the server may be a video captured by a video camera. The video camera may be a fixed common monitoring video camera, which captures scenes within its field of view to form a color video or infrared video. It should be understood that the video camera can be any type of video camera on which no limitation is specifically made in the embodiments of the present application.

In a possible scenario, the video camera is fixedly installed in the teaching classroom and can shoot all students in the classroom to form a first video including all students, wherein multiple human body objects in the first video are all students in the classroom.

Optionally, the first video may be the first video including all students captured during a specific period, for example, during a class period. The first video includes the class activity performance of all students during that period.

It should be understood that, in the embodiment of the present application, the first video may be any video including multiple human body objects. For example, the first video may be a video obtained in any human workplace. No limitation is specifically made on scenes and characters in the first video in the embodiments of the present application.

It should also be understood that, in the embodiments of the present application, no limitation is made on specific parameters such as duration and frame rate of the first video.

After the first video including multiple image frames is obtained, detection is performed on at least one image frame in the multiple image frames, and a detection region of the first object among multiple human body objects of the first video is determined, wherein the detection region of the first object completely contains the first object.

In the embodiments of the present application, a first object of the multiple human body objects is taken as an example. It should be understood that the first object is any one of the multiple human body objects, and the video processing method of each human body object of the multiple human body objects can refer to the video processing method of the first object.

At step S120: a detection region of a first object among the multiple human body objects is determined according to at least one image frame of the first video.

The at least one image frame is an image including the first object. Optionally, any method for detecting a human body can be adopted to perform detection on the at least one image frame to obtain the detection region including the first object.

Among them, the method for detecting the human body includes, but not limited to, detection algorithms for human body shape detection, face detection or other human body feature detection, etc. on which no limitation is specifically made in the embodiments of the present application.

At step S130, human behavior feature detection is performed on the detection region of the first object in the first video, to obtain a first plot video segment of the first object in the first video.

After the detection region of the first object is determined, human behavior feature detection is performed on the detection region of the first object in the first video. Specifically, human behavior feature detection is performed on the detection region of the first object in multiple image frames in the first video. Among them, human behavior features include but not limited to expressions, gestures, actions, voice, etc. According to the detection results of the human behavior features, a plot video segment of the first object in the first video is obtained, and the plot video segment can embody the human behavior features of the first object.

In a possible embodiment, human behavior feature detection can be performed on detection regions in multiple image frames within a first period of the first video to obtain a real-time first plot video segment, and then human behavior feature detection can be performed on detection regions in multiple image frames within a second period of the first video to obtain a real-time second plot video segment.

In another possible embodiment, human behavior feature detection can be performed on a detection region in each image frame in the first video, and one or more plot video segments of the first object can be obtained at the same time.

According to the scheme of the embodiments of the application, any object can be extracted from the first video which includes multiple human body objects, such as a behavior feature plot video segment of the first object, wherein the plot video segment only includes the first object and can reflect behavior features of the first object. Pertinent observation can be carried out on the first object. The problem is solved that the existing first video cannot embody each human body object in a targeted manner, and thus the experience of a video viewer can be improved.

For example, the first video is a video including multiple students captured by a monitoring camera in a classroom, and the first object is a student A. Through the video processing method 100, a feature video segment including only the behavior features of the student A can be obtained, and the one or more plot video segments of the behavior features can be pertinently pushed to parents of student A or presented to a tutor in real-time. Thus parents or teachers can observe the performance of the student A more conveniently.

Figure 3:
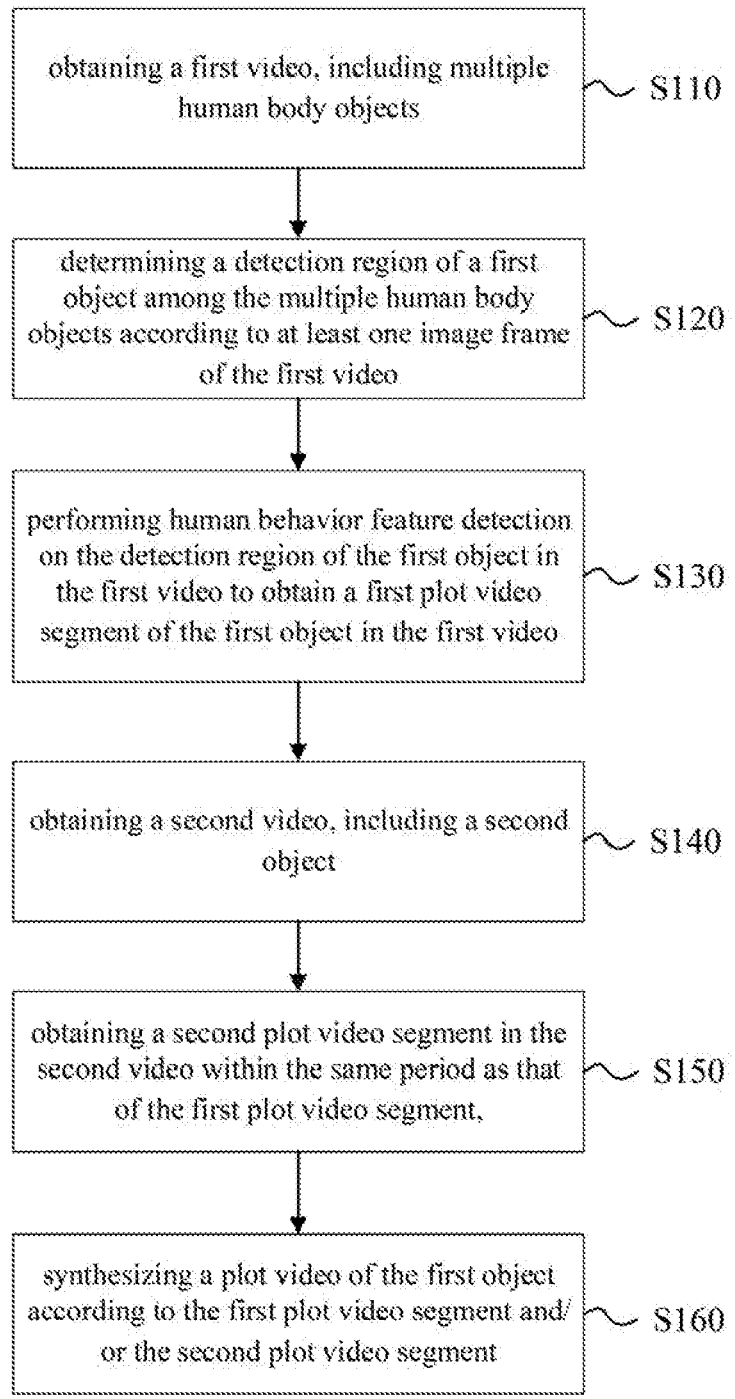
FIG. 3 is a schematic flow chart of another video processing method according to an embodiment of the present application.

Optionally, FIG. 3 shows a schematic flow chart of another video processing method 100 according to the embodiments of the present application.

As shown in FIG. 3, the video processing method 100 further comprises steps S140-S160.

At step S140, a second video including a second object is obtained.

In the embodiments of the present application, the second video can also be a video captured by a video camera, and the second video includes a second object which is different from multiple human body objects in the first video. The video camera capturing the second video can also be any kind of video camera on which no limitation is made in the embodiments of the present application.

Optionally, the video camera capturing the second video and the video camera capturing the first video are video cameras located at different positions, which shoot the same scene at different angles.

In one possible scene, the first video camera capturing the first video and the second video camera capturing the second video are both fixedly installed in a teaching classroom, wherein the first video camera is installed on the side of a podium of the classroom and is mainly used for shooting front faces of students in the classroom. And the second video camera is installed on the opposite side of the podium of the classroom and is mainly used for shooting front faces of teachers.

Specifically, the shooting period of the second video and the shooting period of the first video are at least partially overlapped. In other words, while the first video is captured, at least part of the second video is also captured.

Preferably, the first video and the second video are taken in the same period, and durations of the first video and the second video are equal.

Alternatively, the duration of the second video is longer than the duration of the first video, and the period during which the first video is captured is within the period during which the second video is captured.

It should be understood that in the embodiments of the present application, the second video may be obtained while the first video is obtained. Or after the first video is obtained, the second video within the same period as that of the first video may be obtained. The embodiments of the present application do not specifically limit the order in which the first video and the second video are obtained.

At step S150, a second plot video segment in the second video within the same period as that of the first plot video segment is obtained.

At step S160, a plot video of the first object is synthesized according to the first plot video segment and/or the second plot video segment.

After the second video is obtained, according to the first plot video segment obtained in step S130, a second plot video segment with the same period as that of the first plot video segment is intercepted in the second video, and the count of the second plot video segments is the same as the count of the first plot video segments.

For example, when N first plot video segments of a first object are obtained, the timing of the $i^{th}$ first plot video segment of the N first plot video segments is recorded as $(T_{i,start}, T_{i,end})$, where $1 \leq i \leq N$, N is a positive integer. The N first plot video segments are recorded as $\{Frag_{1,1}, Frag_{1,2}, Frag_{1,3}, \ldots, Frag_{1,n}\}$. According to the recording timing of each first plot video segment of the N first plot video segments, N second plot video segments are obtained and recorded as $\{Frag_{2,1}, Frag_{2,2}, Frag_{2,3}, Frag_{2,i}, \ldots, Frag_{2,n}\}$, where the timing of the $i^{th}$ second plot video segment is also $(T_{i,start}, T_{i,end})$.

Thus, for example, when the first object and the second object are respectively the student A and the teacher in the classroom, the obtained first plot video segment and second plot video segment are respectively a plot video segment corresponding to the behavior features of the student A and a plot video segment of the teacher's response to the behavior features of the student A within the same period. The first plot video segment and the second plot video segment are combined to form a plot video of the first object, so that the performance of the student A and the feedback of the teacher on the performance of the student A can be better presented to the parents of the student A.

Specifically, a detailed description will be given below, with reference to FIGS. 4 to 7, on how to obtain a first plot video segment of a first object in a first video according to the first video.

Figure 4:
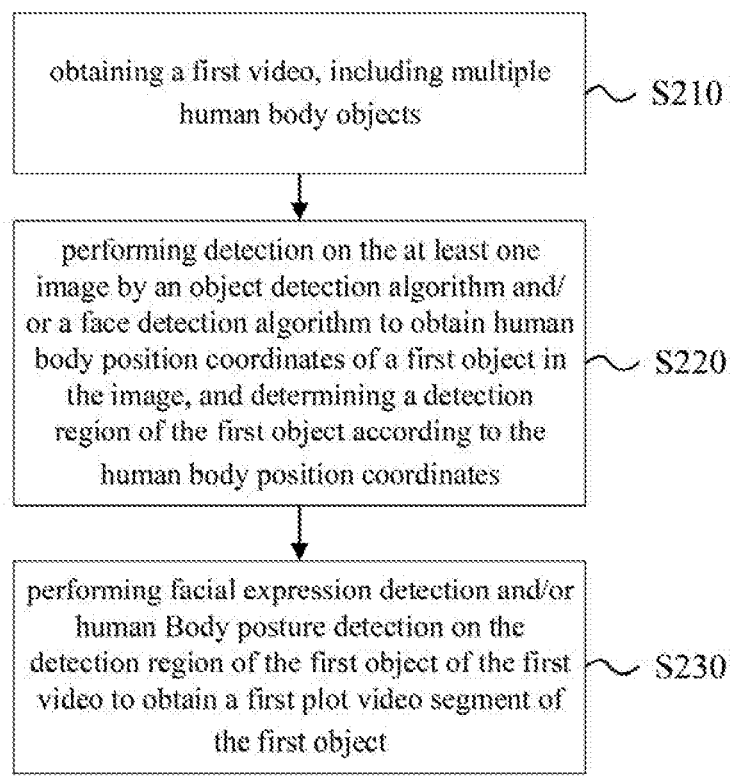
FIG. 4 is a schematic flow chart of another video processing method according to an embodiment of the present application.

FIG. 4 shows a schematic flow chart of a video processing method 200 according to an embodiment of the present application.

As shown in FIG. 4, the video processing method 200 comprises steps S210-S230.

At step S210, a first video including multiple human body objects is obtained.

At step S220, detection is performed on at least one image in the first video by an object detection algorithm and/or a face detection algorithm to obtain human body position coordinates of a first object in the image, and a detection region of the first object is determined according to the human body position coordinates.

At step S230, facial expression detection and/or human posture detection is performed on the detection region of the first object in the first video to obtain a first plot video segment of the first object.

Specifically, step S210 may be the same as step S110 described above, and will not be repeated here.

For step S220, the body position coordinates and the detection region of the first object may be obtained by only object detection or only face detection. optionally, the human body position coordinates may be center coordinates of the detection region. The corresponding detection region may be determined based on the human body position coordinates, and the detection region may be an image region of an image frame centered at the human body position coordinates and within a certain threshold range.

In one possible embodiment, the human body position coordinates and the detection region of the first object are obtained through object detection. Specifically, at least one image frame is selected in the first video for object detection. For example, human body shape detection is performed on one or more image frames by an object detection algorithm, to detect human body position objects of all human body objects including the first object in said one or more image frames. In other words, all human body objects in the image can be found by the method, and other non-human body objects, such as objects in the environment and the like, can be excluded.

Optionally, object detection algorithms include, but not limit to, a region convolutional neural network (RCNN), a fast region convolutional neural network (Fast-RCNN), a faster region convolutional neural network (Faster-RCNN), a spatial pyramid pooling net (SPP-Net), a single shot multibox detector (SSD) and other object detection algorithms. The application does not specifically limit the object detection algorithms.

Preferably, in the embodiments of the present application, the faster region convolutional neural network (Faster RCNN) object detection algorithm is adopted to perform detection on at least one image frame in the first video to obtain the human body position coordinates of the first object and the detection region of the first object.

Specifically, Faster RCNN includes a convolutional network, a region proposal network (RPN), a region of interest pooling (ROI Pooling) layer, and a classification-regression layer. Among them, the convolutional layer is used to extract features of a picture. The input of the convolutional layer is the whole picture. Feature extraction is carried out on the picture, and the output of the convolutional layer is the extracted features, which are called feature-maps. The RPN layer is used to recommend candidate regions. The input of the RPN layer is the feature-maps, and the output of the RPN layer is multiple candidate regions of detection objects. The ROI Pooling layer is used for converting feature-maps of different sizes into feature-maps of the same size for output, and the feature-maps of different sizes are feature-maps for the multiple candidate regions of different sizes. The output of the classification-regression layer is for the final purpose, which outputs categories to which the candidate regions belong, determines whether the candidate regions include human body objects and outputs the precise position of the candidate regions in the image.

Preferably, Faster RCNN can be used in a CPU to detect the human body position coordinates and the detection region of the first object.

In other possible embodiments, human body position coordinates and a detection region of a first object are obtained by the face rough-detection. Specifically, at least one image frame is selected in the first video for face detection. For example, face detection is performed on one or more image frames by a face detection algorithm, to detect object face position coordinates and face regions of all objects including the first object in one or more image frames. Then, human body position coordinates and detection regions of all objects are determined according to the face position coordinates and face regions of all objects. In other words, through the method, the human body object with its front face on the image can be found more accurately.

Optionally, face detection algorithms include, but not limited to, multi-task convolutional neural network (MTCNN), single-shot scale-invariant face detector (S3FD), dual shot face detector (DSFD), and other detection algorithms. The application does not specifically limit the face detection algorithm.

Preferably, in the embodiments of the present application, the multi-task convolution neural network MTCNN is used for face detection, which can detect multiple landmarks on the face. The multiple landmarks are also called face key points or face key landmarks, and are a set of coordinate points located at key positions of the face. For example, the multiple landmarks are a set of coordinate points comprising multiple points located on the five senses organs and facial contours of a human face.

Specifically, the multi-task convolutional neural network MTCNN includes a three-layer network structure of a proposal network (P-Net) for face regions, a refinement network (R-Net) for face regions, and an output network (O-Net) for face landmarks. One or more image frames in the first video are input into the MTCNN network, a large number of candidate face object region boxes are generated through P-Net. Then the face object region boxes are well-selected and border-regressed through R-Net, so that the most inaccurate candidate face object region boxes are excluded. And face regions with high credibility are output. Face discrimination, face region border-regressed and face feature positioning are re-performed by the O-Net on the face regions with high credibility output by the R-Net, so as to obtain more accurate face regions, central position coordinates and coordinate points of key positions on the face regions.

Preferably, the multi-task convolution neural network MTCNN can be used in a CPU for face detection to detect the human body position coordinates and detection region of the first object.

For step S220, the human body position coordinates and the detection region of the first object can also be obtained by a combination of object detection and face detection.

Specifically, the human body object regions are obtained by the human body detection, and face object regions are obtained by face detection. If there is no face object region in a human body object region, it is determined that the human body object region is an invalid human body object region. Correspondingly, a human body object region including a face object region is a valid human body object region. All valid human body object regions and the central coordinates thereof are obtained as detection regions and human body position coordinates thereof for the corresponding objects. Through the combination of object detection and face detection, more accurate human body position coordinates and detection regions of multiple objects can be confirmed.

Figure 5:
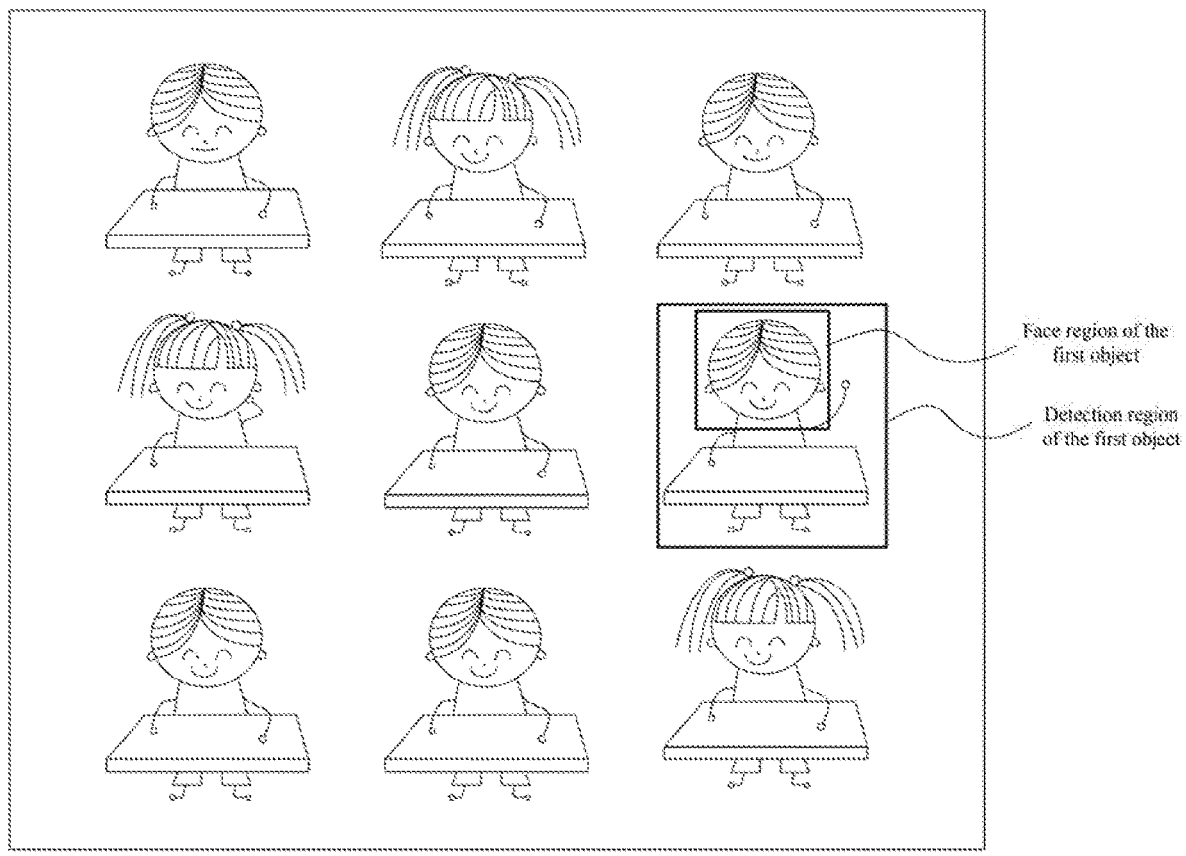
FIG. 5 is a schematic diagram of a detection region of a first object according to an embodiment of the present application.

FIG. 5 shows a schematic diagram of a detection region of a first object in an image frame, which is a schematic image frame in which multiple students attend classes in a classroom.

As shown in FIG. 5, a first object in the figure is student A among multiple students. In one image frame, object detection and/or face detection are performed on all objects (all students) including the first object in the image to obtain human body object regions and face object regions of all objects including student A. Then, human body position coordinates and detection regions of all objects are confirmed according to the human body object regions and the face object regions. More precisely, face regions, face center coordinates, and landmarks on the face of all objects are also obtained by face detection.

Through the above-said object detection and/or face detection, it can be obtained that the center coordinates of the $i^{th}$ student among the W students in the classroom are $(X'_{i, student}, Y'_{i, student})$, where W is a positive integer greater than 1, $1 \leq i \leq W$, and i is a positive integer.

Optionally, after human body position coordinates and detection regions of multiple objects are obtained by performing detection on at least one image frame according to the object detection algorithm and/or the face detection algorithm, one or more reference image frames can be obtained. The human body position coordinates of multiple objects including the first object can be corrected by the reference images.

Figure 6:
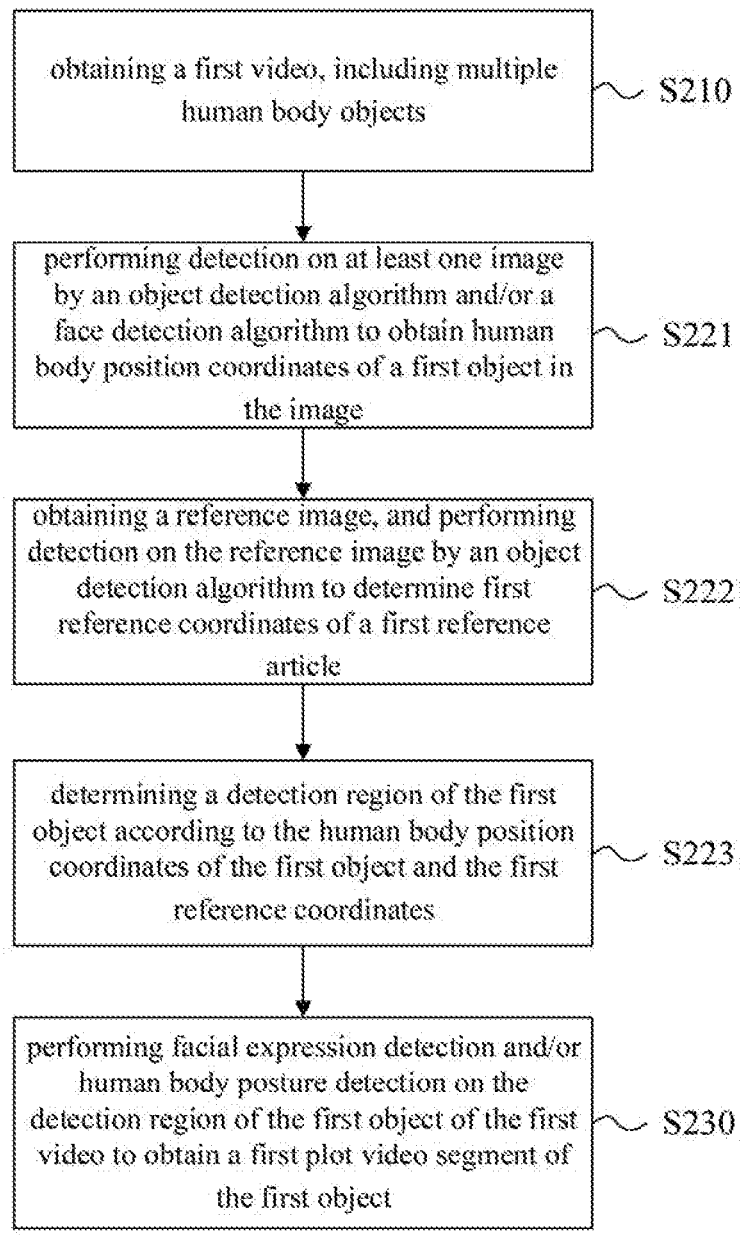
FIG. 6 is a schematic flow chart of another video processing method according to an embodiment of the present application.

FIG. 6 shows a schematic flow chart of another video processing method 200 according to an embodiment of the present application.

As shown in FIG. 6, the video processing method 200 comprises steps S210, S221, S222, S223 and S230.

At step S210, a first video including multiple human body objects is obtained.

At step S221, detection is performed on at least one image in the first video by an object detection algorithm and/or a face detection algorithm to obtain human body position coordinates of a first object in the image.

At step S222, a reference image is obtained, and detection is performed on the reference image by the object detection algorithm to determine first reference coordinates of a first reference article.

At step S223, a detection region of the first object is determined according to the human body position coordinates of the first object and the first reference coordinates.

At step S230, facial expression detection and/or human posture detection is performed on the detection region of the first object in the first video to obtain a first plot video segment of the first object.

Specifically, the reference image does not include a human body object. For example, one or more image frames of the video is captured by the video camera in a specific period, face detection is performed on the image frame, and the image frame can be used as the reference image if no face image is detected therein.

The multiple reference articles in the image are detected to obtain position coordinates of the multiple reference articles in the image as the reference coordinates.

For example, in a classroom, the multiple reference articles can be multiple desks or multiple class chairs, and the multiple reference articles correspond to the multiple objects (students) in one-to-one correspondence.

According to the position coordinates of multiple reference articles, the human body position coordinates of multiple objects are corrected to obtain the corrected human body position coordinates and detection regions of the multiple objects. For example, the first reference article in the multiple reference articles corresponds to the first object in the multiple objects, and the weighted average of the position coordinates of the first reference article and the first object is obtained as the corrected position coordinates of the first object.

For example, when the reference image is an image of an empty classroom where no student attends classes, the W desks and the position coordinates thereof in the reference image can be obtained by object detection. The position coordinates of the $i^{th}$ desk among the W desks are $(X_{i, desk}, Y_{i, Desk})$, and the $i^{th}$ desk corresponds to the $i^{th}$ student among the W students. In other words, the $i^{th}$ student is located at the position of the $i^{th}$ desk in class. The weighted average of the position coordinates of the $i^{th}$ desk (X, desk, Y, desk) and the position coordinates of the $i^{th}$ student $(X'_{i,\ student}, Y'_{i,\ student})$ is obtained as the corrected body position coordinates of the $i^{th}$ student $(X_{i,\ student}, Y_{i,\ student})$.

Optionally, multiple article detection methods can be adopted to detect multiple reference articles in the image, and the multiple article detection methods can also be any one of the above object detection algorithms, which are not limited by the embodiments of the present application.

Preferably, in the embodiments of the present application, based on migration learning, a single-step multi-frame detection SSD model for detecting multiple reference articles is obtained, and the SSD model algorithm is adopted to detect multiple reference articles.

For example, when the multiple reference articles are multiple desks, migration learning training can be performed on the existing SSD detection model for general articles to obtain the SSD model for detecting desks.

Using migration learning training on the SSD detection model for reference articles can simplify the training time of the model and improve the stability and generalization of the model.

It should be noted that, by combining the detection of the reference image and the detection of the image in the first video, besides correction of the human body position coordinates of the human body object in the first video, the coordinates of multiple reference articles in the reference image can correspond to multiple human body objects. In other words, the information of the human body object corresponding to a reference article can be confirmed by the coordinate positions of the reference article. For example, student A is fixed at the position of the first desk during class. Through the position coordinate detection of the first desk and the corresponding position coordinate detection of the first object, it can be determined that the first object is student A. The obtained plot video segment of the first object can be directly presented to the parents of student A without additional collection of other information of student A, thus improving the efficiency of video processing.

As shown in FIG. 4 and FIG. 6, after determining the detection region of the first object, for step S230, facial expression detection and/or human body posture detection are performed on the detection region of the first object of the first video to obtain the first plot video segment of the first object.

The first plot segment includes an object expression and/or an object posture, in other words, facial expression detection and/or human body posture detection are performed on the detection region of the first object of the first video, and the first plot video segment including the object expression and/or the object posture is detected.

First, the process of facial expression detection on the detection region of the first object of the first video is explained.

Optionally, the object expression may include a variety of object expressions including, but not limited to, laughter, doubt, surprise, etc. Multiple object expressions are detected to obtain the multiple first plot video segments of first object including different object expressions.

Taking the first object being the student A and the object expression being smile as an example, the detection region of the student A is obtained according to the human body coordinate position of the student A. In the first video, the detection region of student A is unchanged. It is determined whether there is a smiling face is in the detection region of student A in the first video, and video segments with the smiling face are cropped to obtain one or more first plot video segments of the smiling face of student A. In the first plot video segment, only student A is included, but other students are excluded.

Specifically, facial expression detection methods include facial expression feature extraction and facial expression recognition. Among them, methods of facial expression feature extraction include but not limited to Haar feature extraction, local binary pattern (LBP) feature extraction, and histogram of oriented gradient (HOG) feature extraction. Methods of facial expression recognition include but without limitation to Bayes classification algorithm, neural network classification algorithm, support vector machine (SVM) classification algorithm, adaptive boosting (AdaBoost) algorithm, hidden Markov model (HMM), etc. The application does not specifically limit the method of facial expression detection.

Preferably, in the embodiments of the present application, histogram of oriented gradient HOG feature extraction and support vector machine SVM classification are combined to obtain a detection result of expression detection.

Specifically, the histogram of oriented gradient (HOG) feature can be well used to characterize the representation and shape of the partial object. That is to say, the edges of the image or a region with large gradient changes are extracted. When a face has different expressions, image edge features of the face are different. Thus, the extracted HOG feature vectors are also different. Performing SVM classification on HOG feature vectors which are based on different expressions can determine different expressions on human faces.

Preferably, the histogram of oriented gradient (HOG) feature extraction and the support vector machine SVM classification can be executed in a CPU.

Then, the process of detecting the human body posture in the detection region of the first object in the first video will be explained.

Optionally, an object posture may be a variety of human body postures, including but not limited to standing up, raising hands, raising hands and standing up, etc. The multiple object postures are detected to obtain multiple first plot video segments including the first object with different object postures.

Taking the first object being the student A and the object posture being raising hands and standing up as an example, in the first video, whether the upper limb of student A extends upward is detected in the detection region of student A so as to detect whether student A raises hands or not. In addition, whether the upper body joint position of student A rises is also detected in the detection region of student A so as to detect whether student A stands up. Video segments satisfying the upper limb extension and the upper body joint position rise are cropped to obtain multiple first plot video segments of student A raising hands and standing up.

Specifically, methods for human body posture detection include various human body posture detection algorithms and models, such as DensePose, OpenPose, Real-Time Multi-Person Pose Estimation, AlphaPose, Human Body Pose Estimation, or DeepPose, etc.

Preferably, in the embodiments of the present application, OpenPose human body posture detection algorithm is adopted to detect the human skeleton key points in the first video, thus first plot video segments of different object postures of the first object are detected.

Preferably, OpenPose human body posture detection algorithm is executed in a GPU to obtain a detection result of object postures.

Optionally, in the embodiments of the present application, detection can be performed in detection regions of the first object in all image frames of the first video to obtain N first plot video segments of the first object, where N is a positive integer. Then, based on the N first plot video segments of the first object, optimization processing (described in detail below) is performed to obtain the plot video of the first object.

Optionally, it is also possible to perform detection on detection regions of the first object in a first portion of image frames of the first video to obtain a first first plot video segment of the first object. Then optimization processing is performed based on the first first plot video segment of the first object. After the optimization processing is completed, detection is performed on detection regions of the first object in a second portion of image frames of the first video to obtain a second first plot video segment of the first object. Then optimization processing is performed based on the second first plot video segment of the first object. Operations are performed sequentially in this manner until detections are performed on all image frames in the first video and all processed plot video is obtained.

If N first plot video segments of the first object including the object expression and/or the object posture are obtained after the face expression detection and/or the human body posture detection are performed on the detection region of the first object, M first plot video segments can be selected from the N first plot video segments to form a plot video of a first object, in which $1 \leq M \leq N$ and M is a positive integer.

Figure 7:
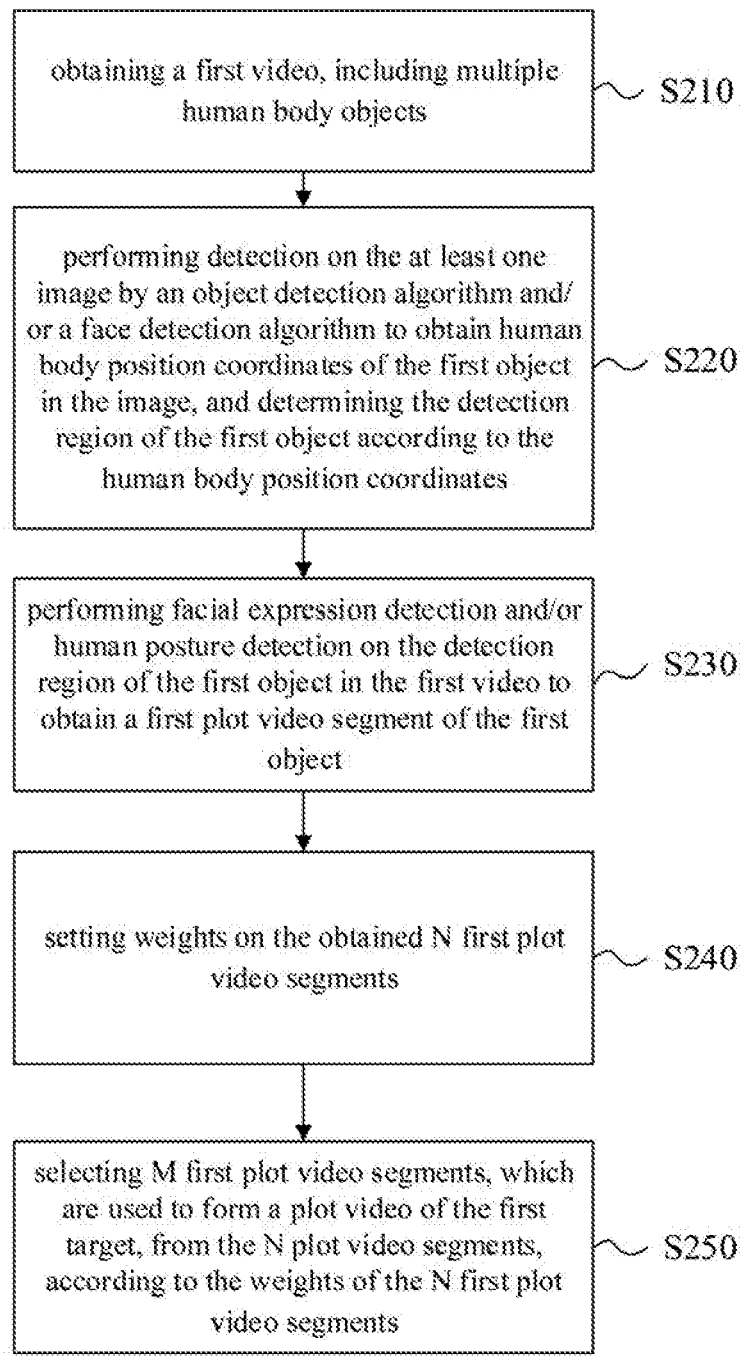
FIG. 7 is a schematic flow chart of another video processing method according to an embodiment of the present application.

FIG. 7 shows a schematic flow chart of another video processing method 200 according to an embodiment of the present application.

As shown in FIG. 7, the video processing method 200 further comprises steps S240 and S250.

At step S240, weights are set for the obtained N first plot video segments.

At step S250, M first plot video segments are selected from the N first plot video segments according to the weights of the N first plot video segments, and are used to form a plot video of the first object.

Specifically, weight value is set for each of the N first plot video segments, and M first plot video segments are selected from the N first plot video segments, wherein the M first plot video segments are the M first plot video segments with M highest weight values in the N first plot video segments.

Optionally, the weight of the $i^{th}$ first plot video segment of the N first plot video segments may include a confidence weight $W_{i, confidence}$, a semantic weight $W_{i, semantic}$, a balance weight $W_{i, balance}$, and an additional weight $W_{i, additional}$.

Optionally, an equation for calculating the weight $W_i$ of the $i^{th}$ first plot video segment of the N first plot video segments is: $W_i = W_{i, confidence} + W_{i, semantic} \times W_{i, balance} + W_{i, additional}$.

Specifically, the confidence weight is a confidence weight corresponding to the first plot video segment in the human body posture detection process or facial expression detection process.

Optionally, the confidence of the first plot video segment obtained through human expression detection is an average value of the human expression detection confidence of multiple image frames in the first plot video segment. Similarly, the confidence of the first plot video segment obtained through human body posture detection is an average value of the human body posture detection confidence of multiple image frames in the first plot video segment.

Specifically, the semantic weight is a preset weight value set according to different first plot video segments. For example, when a first plot video segment is a video segment including an object expression, the semantic weight of the first plot video segment is a first weight value. Or when a first plot video segment is a video segment including an object posture, the semantic weight of the first plot video segment is a second weight value.

Optionally, the second weight value is greater than the first weight value. In addition, when the object expressions include multiple object expressions, the values of semantic weight of the first plot video segments including different object expressions are different. Similarly, when the object postures include multiple object postures, the values of semantic weight of the first plot video segments including different object postures are also different.

For example, when a first video is a classroom video where multiple students attend classes, the first weight value of the first plot video segment including the student object expression is smaller than the second weight value of the first plot video segment including the student object gesture. Specifically, the weight value of the first plot video segment including raising hands is smaller than the weight value of the first plot video segment including standing up. The weight value of the first plot video segment including raising hands and standing up is smaller than the weight value of the first plot video segment including only raising hands or only standing up. More specifically, among multiple first plot video segments including raising hands and standing up, the shorter the time interval between raising hands and standing up, the greater the weight value of the first plot video segment.

Specifically, the balance weight is a correction parameter for correcting the semantic weight, and it is used for multiplying with the semantic weight to calculate a corrected semantic weight.

Optionally, when the count of the first plot video segments including the object posture in the N first plot video segments is greater than a preset threshold, the balance weight of the first plot video segment including the object expression is set as a first balance weight, and the balance weight of the first plot video segment including the object posture is set as a second balance weight.

When the count of the first plot video segments including the object posture in the N first plot video segments is less than or equal to a preset threshold, the balance weight of the first plot video segment including the object expression is set as a third balance weight, and the balance weight of the first plot video segment including the object posture is set as a fourth balance weight.

Among them, the first balance weight is less than the third balance weight, and/or the second balance weight is greater than the fourth balance weight.

Specifically, the additional weight is a preset weight value set according to features other than facial expressions and human body gestures in the first plot video segment. Specifically, in a process of facial expression detection, it is determined whether eyes are open and/or a mouth is open, and the additional weight of the first plot video segment is set according to the result of the determination.

Optionally, when the eyes are open and the mouth is open, the additional weight of the first plot video segment is set as a first additional weight, and when the mouth is closed and/or the eyes are closed, the additional weight of the first plot video segment is set as a second additional weight.

According to the weight values, after M first plot video segments are selected from the N first plot video segments, the M first plot video segments are used to form a plot video of the first object.

According to the embodiments of the present application, M first plot video segments are selected from N first plot video segments, and a plot video of the first object is generated based on the M first plot video segments. The value of M can be adjusted according to the final duration of the plot video of the first object, so the plot videos of the first object with different durations can be generated more flexibly.

Optionally, the first plot video segments can be directly used to form the plot video of the first object, or the first plot video segments can be optimized to obtain optimized first optimized video segments, which are then used to synthesize the plot video of the first object.

In addition, the first plot video segments also correspond to the second plot video segments in the second video. The first plot video segments and the second plot video segments can be directly used to form a plot video of the first object. The first plot video segments and the second plot video segments can also be optimized to obtain the first optimized video segments and the second optimized video segments, which are then used to form the plot video of a first object.

Figure 8:
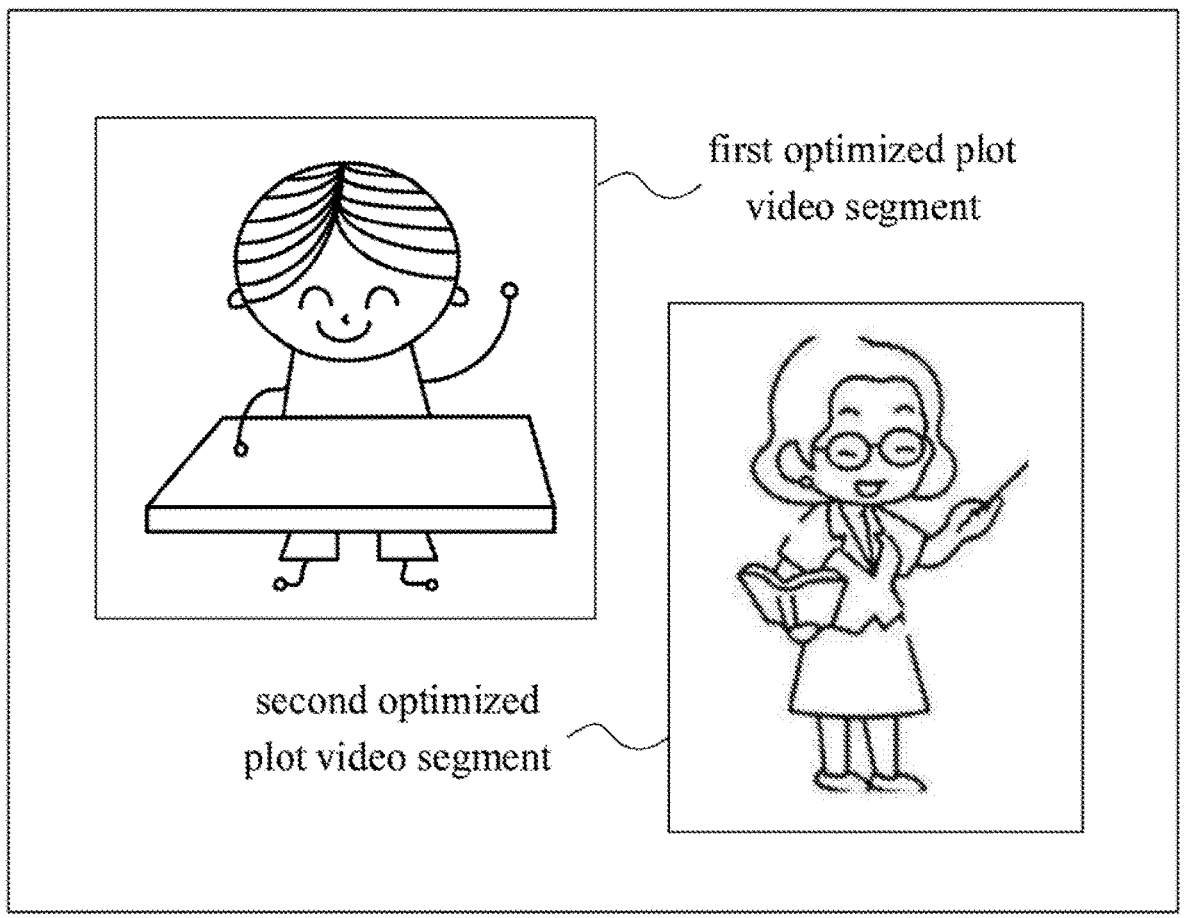
FIG. 8 is a schematic diagram of a plot video of a first object formed by a first optimized plot video segment and a second optimized plot video segment according to an embodiment of the present application.

For example, FIG. 8 shows a schematic diagram of a plot video of a first object formed by a first optimized plot video segment and a second optimized plot video segment. As shown in FIG. 8, the first optimized plot video segment includes a plot video segment of a first object (student), in which only the first object is included but other object students are excluded, and the second optimized plot video segment includes plot video segments of a second object (teacher).

It should be understood that the count of the above-mentioned first plot video segments and second plot video segments may be N, or maybe 1 or M, which are not limited by the embodiments of the present application.

In the embodiments of the present application, the optimization processes for the first plot video segments and the second plot video segments are basically the same. For the convenience of description, if no detailed distinction is made in the optimization process below, both the first plot video segment and the second plot video segment are simply referred to as a plot video segment.

Next, the optimization process will be described in detail by taking a plot video segment as an example. It should be understood that the optimization processes of multiple plot video segments can refer to the plot video optimization process of one plot video segment. It will not be repeated here.

Image transformation

Specifically, the optimization processing may include image transformation to generate a lens language.

Specifically, the lens language can include translation, scaling, rotation, transformation, and the like, which can make a video to present different image effects. Through the transformation of the lens language, different scenes, different angles, different image splicing effects and the like can be presented in the same lens, such that the viewing experience of the audience can be enhanced.

In a traditional way, different lens languages are generated through the transformation of the physical lens. For example, focal lengths of the lens are adjusted, pictures are drawn closer or farther, and long-range scenes or close-range scenes are shot. The lens is moved so as to shoot pictures in different directions and angles, etc.

Using this method to generate lens language usually requires high-quality, movable lens equipment and additional assistance, so it is too complicated and costly to be implemented and is not suitable for normal scenarios such as students attending classes. In addition, the fixed camera usually equipped in the classroom cannot generate different camera languages.

Therefore, in the embodiments of the present application, there is provided a method for automatically generating lens languages according to images, which can obtain videos with multiple lens languages for different objects based on videos shot by fixed camera equipment, thereby reducing cost and improving user experience.

Figure 9:
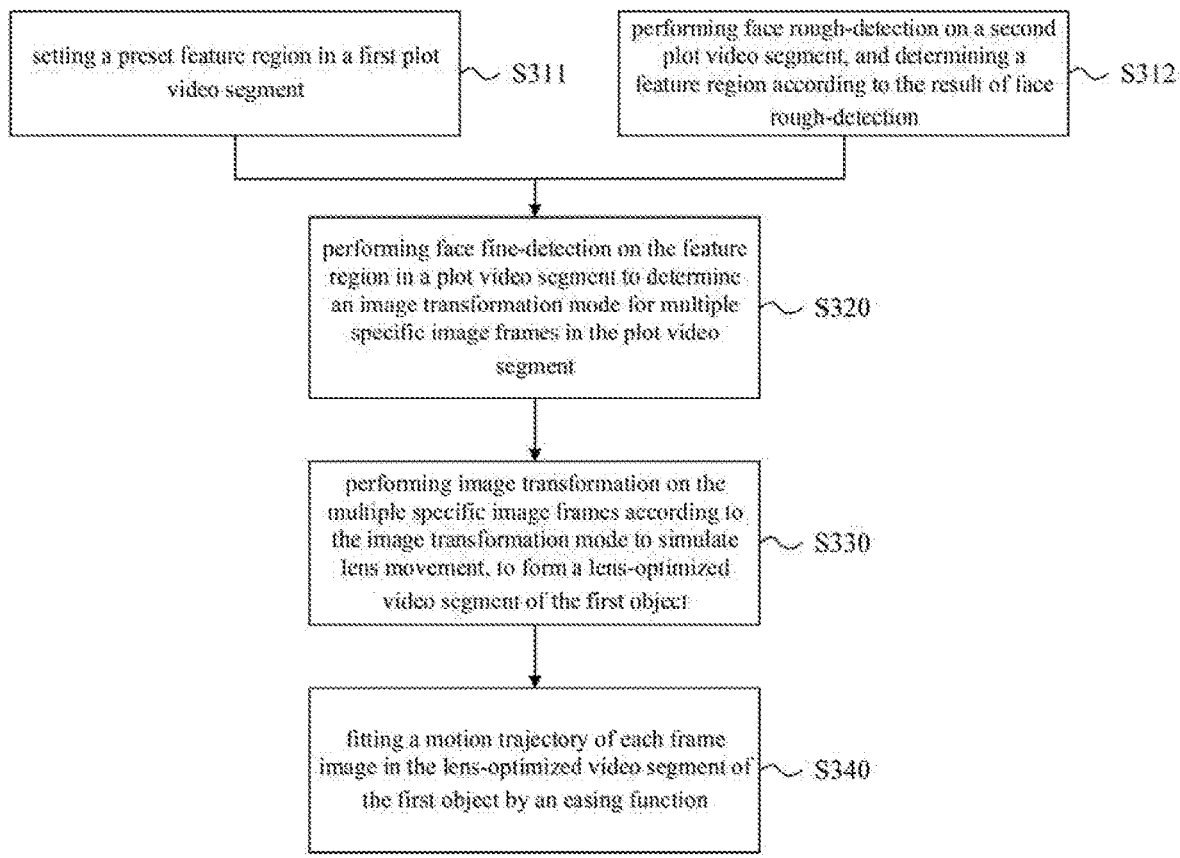
FIG. 9 is a schematic flow chart of another video processing method according to an embodiment of the present application.

FIG. 9 shows a schematic flow chart of another video processing method 300 according to an embodiment of the present application.

As shown in FIG. 9, the video processing method 300 comprises steps S311, S312, S320, S330, S340.

At step S311, a preset feature region is set in a first plot video segment.

At step S312, face rough-detection is performed on a second plot video segment, and a feature region is determined according to the result of face rough-detection.

At step S320, face fine-detection is performed on the feature region in a plot video segment to determine an image transformation mode for multiple specific image frames in the plot video segment.

At step S330, image transformation is performed on the multiple specific image frames according to the image transformation mode to simulate lens movement, to form a lens-optimized video segment of a first object.

Specifically, for the first plot video segment, the feature region (regions of interest (ROI)) include face region of the first object and each image frame in the first plot video segment includes the feature region.

Optionally, since the first object is a role (such as a student) with a fixed relative position, and the position of the feature region including the face of the first object is relatively fixed. Thus, the feature region in the first plot video segment is a preset region set according to the face region of the first object, and the feature region of each image frame in the first plot video segment is the same.

For example, if a plot video segment is a video segment that only contains student A, then the face region of student A is determined as the feature region in the plot video segment, and the feature region of each image frame in the plot video segment is the same.

Optionally, based on a first plot video segment obtained by the video processing method 100 or the video processing method 200, a feature region of the first object can be determined according to the human body position coordinates or the face coordinates of the first object in the first plot video segment, and the feature region includes a face region of the first object.

For the second plot video segment, the feature region includes the face region of the second object. If the second object is a real-time moving character such as a teacher, the position of the feature region including the face of the second object is not fixed, so it is necessary to perform detection on the second plot video segment to determine the feature region including the face region of the second object.

Specifically, face rough-detection is performed on the second plot video segment to obtain a feature region in the second plot video segment.

Among them, a rough-detection rate $Fre_{pre}$ is adopted to perform face rough-detection on the second plot video segment. The calculation equation of the rough-detection rate $Fre_{pre}$ is: $Fre_{pre}=\overline{FPS}/A$, wherein, $\overline{FPS}$ is an average frame rate of the plot video segment, A is a preset value greater than 1, and the rough-detection period corresponding to the rough-detection rate $Fre_{pre}$ is $T_{pre}=1/Fre_{pre}$.

Optionally, A=10.

Optionally, the average frame rate $\overline{FPS}$ can be calculated from the 5$^{th}$ to 25$^{th}$ frames of a plot video segment to avoid an unstable average frame rate calculated from the initial frames. It should be understood that the calculation methods of using the 5$^{th}$ to 25$^{th}$ frames herein are only for explanation, and the embodiments of the present application do not specifically limit the calculation method of the average frame rate.

Optionally, any one of the above-mentioned face detection algorithms can be used to perform face rough-detection on the second plot video segment.

Preferably, in the embodiments of the present application, Haar feature extraction and adaptive lifting (Adaboot) algorithm are used for face rough-detection. The method has a fast speed for face detection and can improve the performance of video processing.

In a rough-detection period, each image frame in the second plot video segment is subjected to face rough-detection to obtain the position coordinates of the face in each image frame, and the average position coordinates ($\overline{X_0}$, $\overline{Y_0}$) of the faces in the rough-detection period are calculated. The range of human face activity in a rough-detection period, namely the width and height values ($W_0$, $H_0$) of the feature region, is determined according to the experienced pace of normal walking of a person. The feature region $ROI_0$ in the rough-detection period is obtained according to the range values ($W_0$, $H_0$) and the average position coordinates of the face.

According to the above method, multiple feature regions in multiple rough-detection periods in the second plot video can be obtained. The feature regions corresponding to different rough-detection periods may be the same or different.

Lens Language Generation

After determining the feature regions in the first plot video segment and the second plot video segment, in step S320, face fine-detection is performed on the feature regions in the plot video segments (including the first plot video segment and the second plot video segment) to determine the image transformation mode of multiple specific image frames in the plot video segment to generate the lens language.

Specifically, a specific frame rate is adopted to perform face detection on a feature region in a plot video segment to determine an image transformation mode of multiple specific image frames in the plot video segment, so as to generate the lens language.

Specifically, an equation of the specific frame rate $Fre_{final}$ is: $Fre_{final}=\overline{FPS}/B$, wherein, $\overline{FPS}$ is the average frame rate of the plot video segment, B is a preset value greater than 1, and the specific frame period corresponding to the specific frame rate $Fre_{final}$ is $T_{final}=1/Fre_{final}$.

In the embodiments of the present application, B<A, that is, the specific frame rate $Fre_{final}$ is greater than the rough-detection rate $Fre_{pre}$ and smaller than the average frame rate $\overline{FPS}$.

Optionally, B=2.5.

Specifically, face detection is performed on feature regions in multiple specific image frames in a plot video segment at the specific frame rate to obtain the sum $\Sigma FaceDetected$ of the count of faces in the multiple feature regions in a first detection period and the sum ($\Sigma x$, $\Sigma y$) of the center coordinates of the face regions in each of the multiple feature regions.

Therein the first detection period is greater than $1/Fre_{final}$. Optionally, the first detection period is a rough-detection period $T_{p}re$ for rough-detection of a human face.

For example, the average frame rate $\overline{FPS}$=60 fps, A=10, B=2.5. At this time, the specific frame rate $Fre_{final}$=24 fps, that is, the plot video segment in 1s includes 60 frames of images, and only the feature regions in 24 specific image frames are subjected to face detection. When the rough-detection period is 1/6 s, face detection is performed on the feature regions in 4 specific image frames in each detection period, and the sum of the count of faces in the 4 feature regions and the sum of the central coordinates of the face regions in the 4 feature regions are determined.

In the embodiments of the present application, the method of face detection is not limited. For example, the MTCNN algorithm can be used for face detection. Face regions, center coordinates, and landmarks in multiple feature regions can be obtained by using Bounding Box Regression and Non-Maximum Suppression (NMS).

Then, according to the sum $\Sigma FaceDetected$ of the count of faces in the multiple feature regions in the first detection period and the sum ($\Sigma x$, $\Sigma y$) of the center coordinates of the face region in each of the multiple feature regions in the first detection period, the lens language in the first detection period is determined. For example, the scaling ratio of the feature region and the distance that the feature region moves are determined, so that the specific image frame in the first detection period can be scaled and moved, thereby simulating zooming in/out, movement, heel, up, down and other actions of the lens.

Specifically, the equations for scaling of the feature region ROI is as follows:

$$Scaling = \begin{cases} \dfrac{\sum FaceDetected}{Fre_{final}}, & 1 \le \sum FaceDetected \le Fre_{final} \\ Scaling_{max}, & \sum FaceDetected > Fre_{final} \text{ or } \sum FaceDetected < 1 \end{cases},$$

Therein, Scalingmax is a preset maximum scaling value, such as 100%, 80%, or any other numerical value, which are not limited by the embodiments of the present application. Scaling is a scaling ratio of a specific image frame in the first detection period.

Specifically, the equation of the center coordinate ($X_{moving}$, $Y_{moving}$) of feature region ROI after movement is as follows:

$$X_{moving} = \begin{cases} \dfrac{\sum x}{\sum FaceDetected}, & 1 \le \sum FaceDetected \le Fre_{final} \\ X_{default}, & \sum FaceDetected > Fre_{final} \text{ or } \sum FaceDetected < 1 \end{cases},$$

$$Y_{moving} = \begin{cases} \dfrac{\sum y}{\sum FaceDetected}, & 1 \le \sum FaceDetected \le Fre_{final} \\ Y_{default}, & \sum FaceDetected > Fre_{final} \text{ or } \sum FaceDetected < 1 \end{cases}.$$

Therein $X_{default}$ and $Y_{default}$ are preset object position coordinates, for example, the coordinates are the center coordinates of an image frame, etc. on which no limitation is made in the embodiments of the present application.

The center coordinates of the feature region before the movement are ($X_{original}$, $Y_{original}$) and the center coordinates of the feature region after the movement are ($X_{moving}$, $Y_{moving}$). According to the center coordinate values before and after the movement, it is determined that the movement distance of a specific image frame in a first detection period is ($\Delta X$, $\Delta Y$), where, $\Delta X = X_{moving} - X_{original}$, $\Delta Y = Y_{moving} - Y_{original}$.

Therefore, the Scaling and moving distance ($\Delta X$, $\Delta Y$) of a specific image frame in a plot video segment in the first detection period can be determined according to the above method.

Optionally, the specific image frame may be any image frame in the first detection period or an image obtained by averaging multiple image frames in the first detection period.

It should be understood that in the embodiments of the present application, multiple first detection periods need to be adopted to perform a complete detection on the plot video segment and generate the lens language within the corresponding detection periods. The detection for each first detection period can adopt the above method to detect and determine the scaling ratio of a specific image frame and the position coordinates after the movement of the feature region. Moreover, in the different multiple first detection periods, the scaling ratios of specific image frame and the position coordinates after movement of the feature region may be different.

Image Transformation

For step S330, after determining the image transformation method (including scaling ratio and moving distance) of the plot video segment according to the generated lens language, image transformation (such as scaling and moving) is performed on multiple specific image frames in the plot video segment.

Specifically, after zooming and moving multiple specific image frames in the plot video segment, the plot video segment is cropped to obtain a lens-optimized video segment of the first object, therein each image frame in the lens-optimized video segment is equal in size. That is, in the cropped lens-optimized video segment, video images with different zoom ratios and region movement transformations are presented to simulate and display different lens languages.

Figure 10:
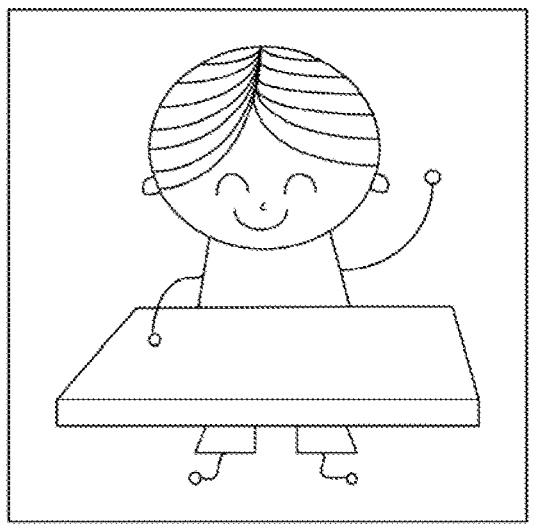
FIG. 10 is a schematic diagram of image transformation in optimization processing according to an embodiment of the present application.
Figure 10:
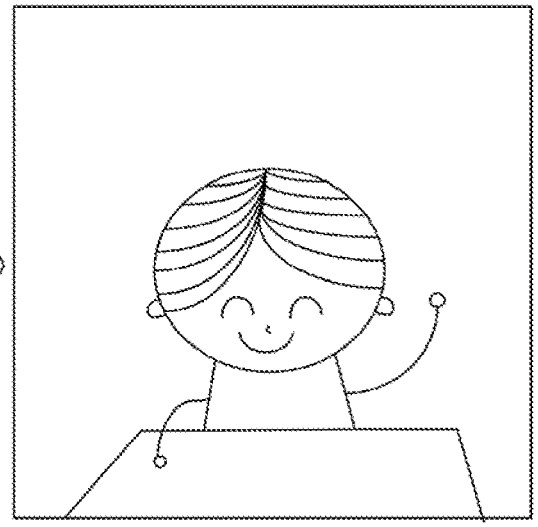
Figure 10:
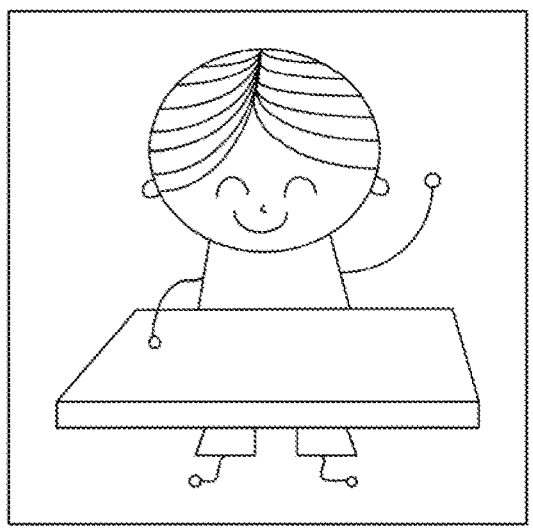
Figure 10:
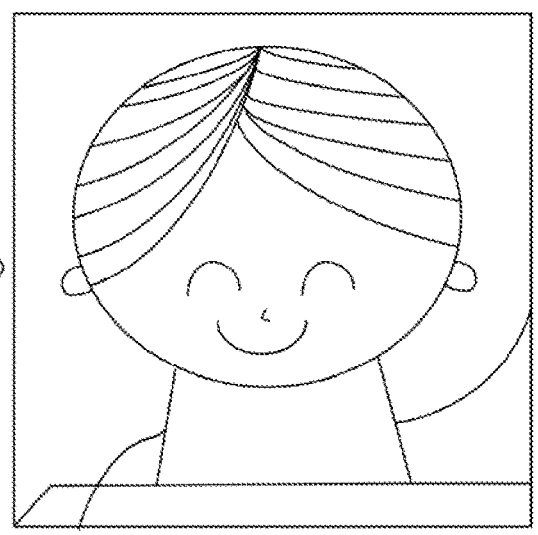

For example, FIG. 10 shows a schematic diagram of several image transformations. FIG. 10 (a) to FIG. 10 (b) show schematic diagrams of video images after movement transformation, a student's face moves from the upper half portion of the image in FIG. 10(a) to the image center in FIG. 10(b). FIG. 10(c) to FIG. 10(d) show schematic diagrams of a video image after scaling transformation, the student's face is scaled up in the image, and the video image mainly highlights the student's facial expression.

Optionally, multiple specific image frames in the plot video segment are subjected to image transformation in a texture UV coordinate transformation manner, such as zooming and moving.

Texture UV coordinates refer to coordinates of the image on a two-dimensional plane. The horizontal direction is U and the vertical direction is V. The texture UV coordinates can be located to any pixel in an image frame, and the pixel can contain information such as color.

Specifically, a lens-optimized image frame can be formed by performing texture UV coordinate transformation and cropping on a specific image frame in a plot video segment. For example, the texture UV coordinates are scaled and moved to realize scaling and moving of the image, the scaled and moved image is set in a two-dimensional (2D) display model, and the image located outside the two-dimensional display model is cropped out when the size of the image is larger than the two-dimensional display model.

For example, when the two-dimensional display model is quadrilateral or circular, the specific image frame is set in the quadrilateral or circular region, the center of the feature region in the specific image frame is the center of the quadrilateral display model or circular display model, and portions of specific image frame located outside the quadrilateral or circular region are cropped to form a quadrilateral or circular optimized image.

Similarly, based on the method, texture UV coordinate transformation is performed on multiple specific image frames in a plot video segment to form multiple lens-optimized images, which are then combined to form a lens-optimized video segment in a two-dimensional display model.

Optionally, in the embodiments of the present application, texture UV coordinates transformation can be performed in a Frame Buffer of graphic processing units (GPU) by using a shader program. The texture UV coordinates transformation by adopting this method can utilize the advantage of GPU suitable for matrix calculation, which can simultaneously carry out the coordinate transformation on multiple videos and maintain real-time performance, thereby greatly improving the performance of video processing.

Specifically, in the process of texture UV coordinates transformation by using shader program, the lens-optimized video segment can be displayed on a display device of electronic equipment (e.g., server) in real-time, or can be stored in the memory of the electronic equipment.

The shader program includes a pointer module $FBO_{active}$, a display module $FBO_{display}$, and a transformation module $FBO_{imgTransform}$ (one example of a processing module). When the pointer module $FBO_{active}$ points to the display module $FBO_{display}$, the contents of the $FBO_{active}$ are displayed on the display equipment. When the pointer module $FBO_{active}$ points to the transformation module $FBO_{imgTransform}$, the contents of the pointer module $FBO_{active}$ are subjected to texture UV coordinate transformation. After the transformation is completed, the contents of the $FBO_{active}$ are copied into the memory.

Specifically, firstly, the contents in the display module $FBO_{display}$ are stored in the storage module of the frame cache, then the pointer module $FBO_{active}$ is transformed from pointing to $FBO_{display}$ to pointing to $FBO_{imgTransform}$. The specific image frame in the plot video segment are copied to $FBO_{active}$ for texture UV coordinate transformation. After the transformation is completed, the lens-optimized image are obtained in $FBO_{active}$. The lens-optimized image is copied to the memory of the electronic equipment, and then the $FBO_{active}$ is restored to point to $FBO_{display}$, so that the lens-optimized image can be displayed in a display device of the electronic equipment.

In the embodiments of the present application, the shader program includes multiple transform modules $FBO_{imgTransform}$ and a display module $FBO_{display}$, wherein one transform module $FBO_{imgTransform}$ corresponds to one transform operation, for example, different zoom modes, movement modes, or other three-dimensional transform modes, etc. The count of the multiple transform modules $FBO_{imgTransform}$ is a first preset number, and the first preset number of transform modules can be maintained through a pool maintenance mode. It can be designated that different transform operations are performed through different transform modules in the pool, so that the creation and destruction of the $FBO_{imgTransform}$, which may cause additional overhead of resources, are not required every time a transform operation is performed.

Lens Smoothing

In the lens language generation process, a feature region is obtained based on a face rough-detection rate $Freq_{pre}$, and a lens-optimized video segment is obtained based on a specific frame rate $Freq_{final}$. The face rough-detection rate and the specific frame rate are smaller than the average frame rate of the plot video segment. Therefore, the lens languages are not generated for each image frame in the plot video segment, and the lens languages are different in different periods, that is, different zoom ratios and moving distances of the images in different periods, which will cause unsmooth lens switching, thus leading incoherent visual effects of the lens-optimized video segment formed after image zooming, moving and cropping, which will affect the user experience.

Therefore, in the embodiments of the present application, after performing image transformation on the plot video segment to form the lens-optimized video segment, an easing function is adopted to smooth the lens-optimized video segment.

As shown in FIG. 9, the video processing method 300 further comprises step S340.

At step S340, a motion trajectory of each image frame in the lens-optimized video segment of the first object is fitted by an easing function.

Because in ordinary life objects usually accelerate and decelerate in the process of movement, our brains are accustomed to this natural movement of objects. Therefore, in video processing, the user experience will be improved by allowing the objects in the video to present this natural motion mode through an easing function.

In the embodiments of the present application, the easing function includes but not limited to a liner function (Liner), a quadratic easing function, a cubic easing function, a sinusoidal sine curve easing function, an exponential curve easing function, a circular curve easing function, an exponential decay rebound easing function, and the like. Among them, each easing function is divided into three easing modes, which are respectively: easing with acceleration from 0 (EaseIn); easing with deceleration to 0 (EaseOut); easing with a first-half acceleration from 0 and a second-half deceleration to 0 (EaseInOut). In the embodiments of the present application, no limitation is made on a specific easing function.

Preferably, EaseInOutSine easing function is used to smooth each lens-optimized image frame in the lens-optimized video segment. That is, according to the easing mode of a sinusoidal curve, the moving speed of each lens-optimized image frame is accelerated firstly, and then the moving speed of each lens-optimized image frame is decelerated.

Specifically, an equation of EaseInOutSine easing function is: $EaseInOutSine(t)=-\frac{1}{2}\cos(\pi*t)-1)$, where t is time. $EaseInOutSine(t)$ can be the change, with time, of the movement speed of each image frame in the lens-optimized video segment.

Specifically, after smoothing the movement of each lens-optimized image frame by using the easing function, the movement duration of each lens-optimized image frame is recorded as the easing duration Tease, and the equation of the easing duration Tease is:

$$T_{ease} = \frac{Fre_{final} + \alpha}{Fre_{final}}.$$

Therein $F_{refinal}$ is the specific frame rate and α is a preset first correction coefficient.

Optionally, the easing duration Tease of each lens-optimized image frame in the lens-optimized video segment may be the same or different.

The easing function is adopted to smooth each lens-optimized image frame in the lens-optimized video segment. Thus, the discontinuity caused by lens change in the lens-optimized video segment due to lens language transformation is avoided and the user's experience is improved.

Optionally, the program code can be executed in a CPU to directly call the easing function to smooth the lens-optimized video segment.

Optionally, the easing function can also be called in the CPU based on a delegate mechanism. Specifically, one or more easing functions are registered in a delegate, and the running results of one or more easing functions are obtained by calling the delegate. Calling the easing function based on the delegation mechanism can decouple the calling and the running of the function and is more convenient to use.

Optionally, the optimization process also includes face image processing.

Optionally, after the lens-optimized video segment is obtained by the above video processing method 300, face image processing is performed on the lens-optimized video segment to further optimize and highlight the face region in the video segment to obtain the optimized video segment of the first object.

Optionally, face image processing includes face reconstruction and lens blur processing.

Face Reconstruction and Lens Blur Processing

In order to highlight the first object in the first optimized video, the background other than the first object in the first optimized video can be blurred, i.e. the effect of shallow Depth of Field (DOF) can be obtained.

At present, the ordinary camera cannot obtain depth information of the object, nor can it directly obtain a shallow DOF effect. Therefore, the images and videos captured by the ordinary camera cannot highlight the object in the images and videos, resulting in a bad user's perception experience.

Therefore, in the embodiments of the present application, lens blurring processing can be realized by performing background blurring and face super-resolution reconstruction based on the face region obtained by face detection, so that the face region of the first object in the lens video segment can be highlighted, thus improving video quality and user experience.

Figure 11:
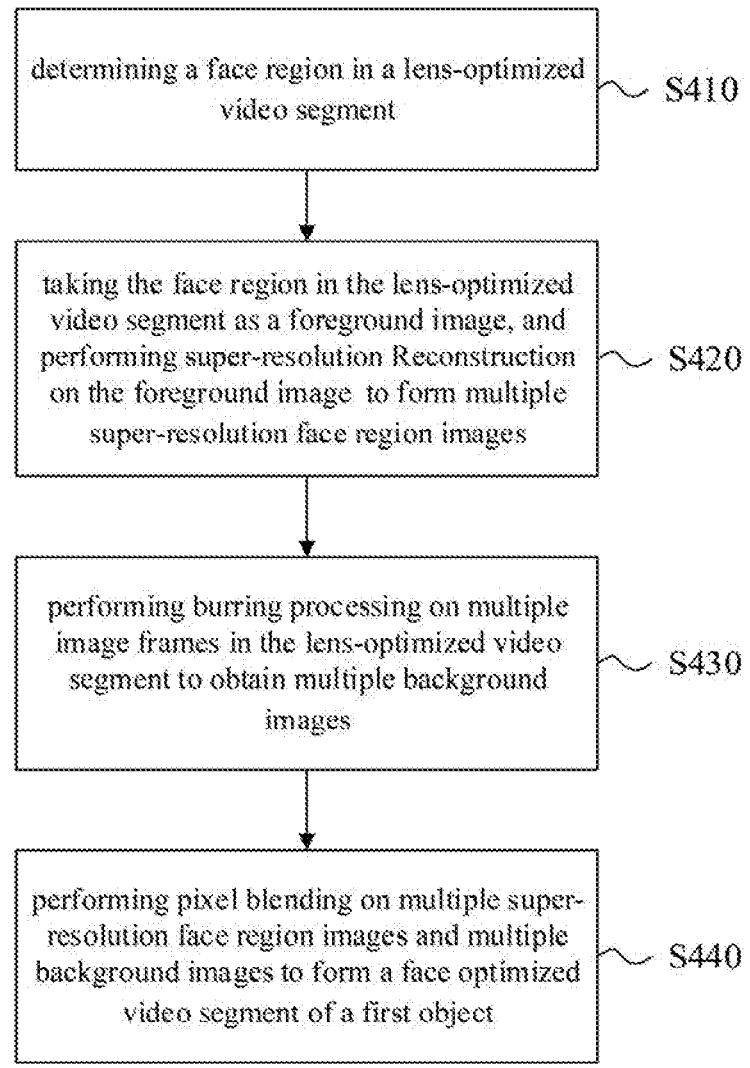
FIG. 11 is a schematic flow chart of another video processing method according to an embodiment of the present application.

FIG. 11 shows a schematic flow chart of another video processing method 400 according to an embodiment of the present application.

As shown in FIG. 11, the video processing method 400 comprises steps S410-S440.

At step S410, a face region is determined in a lens-optimized video segment.

Optionally, based on the above-mentioned step S320, face fine-detection can be performed on plot video segments based on a specific frame rate $Fre_{final}$, so as to detect face regions of multiple specific image frames.

Further, when zooming, moving and cutting are performed on the multiple specific image frames in the plot video segment to form the lens-optimized video segment, the face regions in the multiple specific image frames are also processed by correspondingly zooming and moving, so that the face regions of the multiple lens-optimized images in the lens-optimized video segment can be determined.

At step S420, the face region in the lens-optimized video segment is taken as a foreground image $Img_{fg}$, and super-resolution (SR) reconstruction is performed on the face region to form multiple super-resolution face region images $Img_{sr}$.

Specifically, the super-resolution reconstruction method includes, but not limited to, a sparse coding method, an anchored neighborhood regression method, a Bayesian method, a Self-Exemplars transformation method, a deep learning method, a perceptual loss and GAN etc. In the embodiments of the present application, no limitation is made on the super-resolution reconstruction method.

Preferably, in the embodiments of the present application, the super-resolution reconstruction of the foreground image $Img_{fg}$ is performed by a Pix2Pix model algorithm in a generation adversarial network (GAN).

Specifically, the Pix2Pix model algorithm includes a generation network G (Generator) and a discrimination network D (Discriminator). Firstly, the foreground image $Img_{fg}$ is input into a generation network G, which generates an output image G ($Img_{fg}$) based on the foreground image $Img_{fg}$. The output image G ($Img_{fg}$) and the foreground image $Img_{fg}$ are input together into a discrimination network D. It is determined whether the output image G($Img_{fg}$) is true or not, and if true, the reconstructed super-resolution face region image $Img_{sr}$ can be output.

Adopting Pix2Pix model algorithm for super-resolution reconstruction of the foreground image of the face region, firstly, can reduce the resolution requirement of the input image during migration training, thus reducing the difficulty of obtaining the input data set; and secondly, can optimize the performance of super-resolution reconstruction.

At step S430, burring processing is performed on multiple image frames in the lens-optimized video segment to obtain multiple background images $Img_{bg}$.

Optionally, the burring processing method includes, but not limited to, mean blur, gaussian blur, median blur, bilateral blur, and the like.

Preferably, in the embodiments of the present application, a mean blur method is adopted to blur the multiple lens-optimized image frames in the lens-optimized video segment. Specifically, convolution calculation is performed on the data of each channel of RGB channels in each lens-optimized image frame. For example, the R channel data of each lens-optimized image frame is a matrix with the same size as the image frame, wherein each value corresponds to a red component of each pixel value in the image. Each lens-optimized image frame includes a matrix of three color components R, G and B. Convolution calculation of mean blurring is respectively performed on the matrix of the three color components to obtain a blurred background image $Img_{bg}$ after mean-blurring of each lens-optimized image frame.

Optionally, the size of each lens-optimized image frame is the same, and kernel size can be 0.03 times of each lens-optimized image frame.

At step S440, pixel blending is performed on multiple super-resolution face region images $Img_{bsr}$ and multiple background images $Img_{bg}$ to form a face optimized video segment of the first object.

Firstly, multiple super-resolution face region images $Img_{sr}$ are subjected to blurring processing to obtain blurred super-resolution face region images $Img_{bsr}$.

Specifically, data of an Alpha channel of the super-resolution face region image $Img_{sr}$ is subjected to blurring processing to obtain a blurred super-resolution face region image $Img_{bsr}$. The data of Alpha channel is data representing the transparency degree of pixels, and the larger the Alpha value, the weaker the transparency effect of the image. The data of Alpha channel of the super-resolution image $Img_{sr}$ is a matrix with the same size as the super-resolution image $Img_{sr}$, wherein each value corresponds to the transparency component of each pixel value in an optimized image frame.

Optionally, convolution calculation of mean blurring method is performed on the data of Alpha channel of the super-resolution image $Img_{sr}$. Optionally, the size of the convolution kernel maybe 0.03 times the size of the super-resolution image $Img_{sr}$.

Then, pixel blending is performed on multiple super-resolution face region images $Img_{bsr}$ and multiple background images $Img_{bg}$ to obtain multiple face optimized images $Img_{rb}$, which can be used for forming the face optimized video segment of the first object.

Specifically, pixel blending is performed by Alpha Blending (a Blending), and an equation of the pixel value in the face optimized image $Img_{rb}$ obtained by Alpha Blending is as follows:

$$Img_{rb}.RGB=Img_{bsr}.RGB+Img_{bg}.RGB*(1-Img_{bsr}.Alpha),$$

Therein, $Img_{rb}.RGB$ is the RGB component corresponding to each pixel in the face optimized image $Img_{rb}$. $Img_{bsr}.RGB$ is the RGB component corresponding to each pixel in the blurred super-resolution face region image $Img_{bsr}$. $Img_{bg}.RGB$ is the RGB component corresponding to each pixel in the background image $Img_{bg}$. $Img_{bsr}.Alpha$ is the Alpha component corresponding to each pixel in the blurred super-resolution face region image $Img_{bsr}$.

The RGB components of each pixel in the face optimized image $Img_{rb}$ are calculated through the above equation, so that the face optimized image $Img_{rb}$ corresponding to each image frame in the lens-optimized video segment can be obtained, and the face optimized video segment of the first object can be generated.

Optionally, in the embodiments of the present application, Alpha Blending can be performed by executing the shader program in the GPU's Frame Buffer.

Optionally, the above-mentioned Alpha Blending process can be implemented by a transformation module $FBO_{imgTransform}$.

Optionally, face image processing also includes light-mapping.

Optionally, after the face optimized video segment is obtained by the above video processing method 400, light-mapping processing can be performed on the face optimized video segment to further optimize and highlight the face region in the video segment, so that the optimized video segment of the first object can be obtained.

Spotlight Effect Generation

In the embodiments of the application, by introducing the light-mapping and controlling movements of lightmaps through an easing function, the simulated spotlight effect can follow the face region of the first object in real-time, thus further improving the user's experience.

Figure 12:
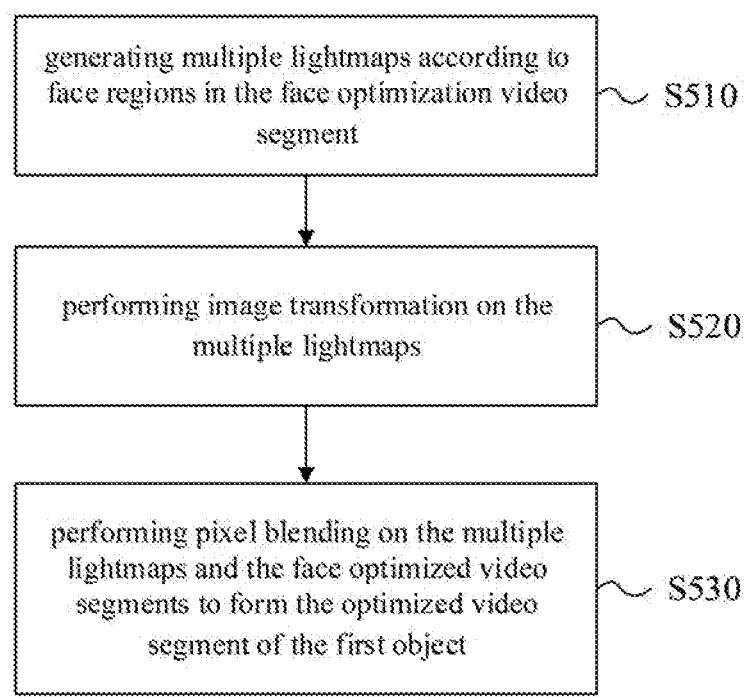
FIG. 12 is a schematic flow chart of another video processing method according to an embodiment of the present application.

FIG. 12 shows a schematic flow chart of another video processing method 500 according to an embodiment of the present application.

As shown in FIG. 12, the video processing method 500 comprises steps S510-S530.

At step S510, multiple lightmaps are generated according to face regions in the face optimization video segment.

Specifically, the multiple lightmaps are multiple images with brightness and shading changes, which can simulate light effects and shadow and shading changes caused by lights. For example, the lightmaps can be the light spots formed by simulating spotlight effects.

Optionally, the multiple lightmaps are generated based on the face regions in the face optimized video segment, and the size of the multiple lightmaps is related to the size of the face regions in the lens-optimized video segment.

For example, the face optimized video segment includes a face region of student A. The size of light spots in lightmaps are greater than or equal to the face regions of student A. In other words, the face regions of student A can be completely located within the light spots of the lightmaps.

At step S520, image transformation is performed on the multiple lightmaps.

Optionally, a texture UV coordinates transformation method is adopted to perform movement transformation on multiple lightmaps, wherein the movement frequency is equal to the frame rate $Fre_{final}$. The center point coordinates of each lightmap are the same as the center coordinates of the face region in one image frame in the face optimized video segment. For each image frame in the face optimization video segment, it has a corresponding lightmap, and the center coordinates of the face region therein are the same as the center coordinates of the corresponding lightmap.

Optionally, an easing function is adopted for easing control of the movement of multiple lightmaps.

Optionally, the easing functions of the lightmaps are the same as the easing functions of the multiple lens-optimized image frames in the lens-optimized video segment of the lens smoothing process (step S340). For example, an easing function of the lightmaps also uses EaseInOutSine easing function for easing control of the movement of the lightmaps. The easing duration of the easing function is $T'_{ease}$, and the equation of the easing duration $T'_{ease}$ is:

$$T_{ease} = \frac{Fre_{final} + \alpha'}{Fre_{final}}.$$

Therein, $Fre_{final}$ is a specific frame rate, $\alpha'$ is a preset second correction coefficient, and the second correction coefficient $\alpha'$ is slightly greater than the first correction coefficient $\alpha$ of each lens-optimized image frame in the lens-optimized video segment. For example, $\alpha < \alpha' \leq \alpha + 10$.

At step S530, pixel blending is performed on the multiple lightmaps and the face optimized video segments to form the optimized video segment of the first object.

Specifically, each image frame in the optimized video segment of the first object includes image information of a lightmap and image information of a face optimized image.

Specifically, the pixel information of a lightmap is used to represent the pixel brightness information in the optimized image, and the brightness of the optimized image frame in the optimized video is greater in the bright place of the lightmap and smaller in the dark place of the lightmap.

Figure 13:
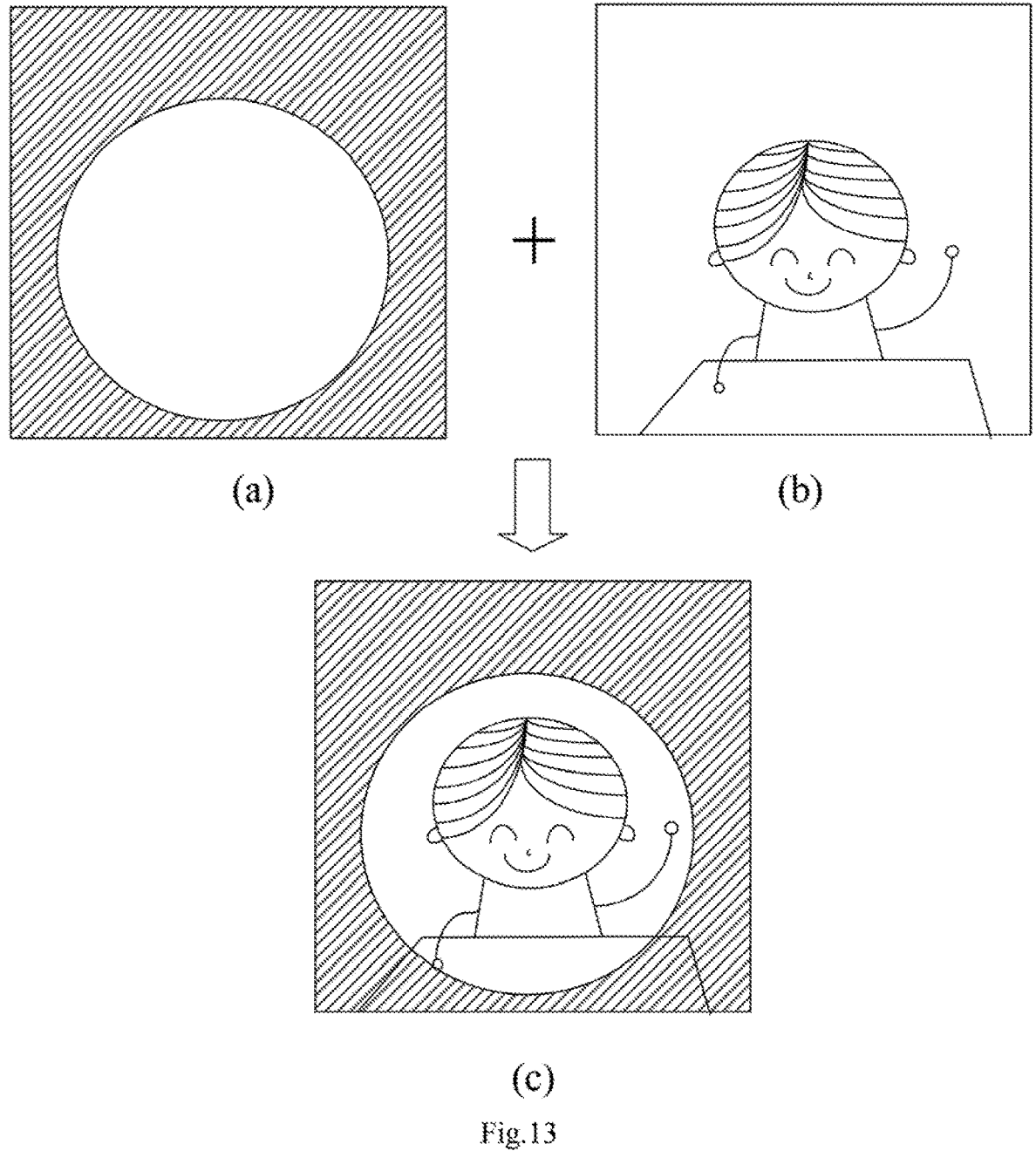
FIG. 13 is a schematic diagram of lightmapping in an optimization process according to an embodiment of the present application.

As shown in FIG. 13, FIG. 13 (a) is a schematic diagram of a lightmap, and FIG. 13(b) is a schematic diagram of a face optimized image. Pixel blending of FIG. 13(a) and FIG. 13(b) results in an optimized image as shown in FIG. 13(c). In FIG. 13(c), in the face image, the brightness is larger at a bright light position, and the brightness is smaller at a dark light position and thus a dim effect is presented. The face region is more highlighted in the optimized image.

Optionally, in the embodiments of the present application, a shader program can be executed in a Frame Buffer of a GPU to perform image transformation of lightmapping.

Optionally, the image transformation process of the above lightmaps can be implemented by the transformation module $FBO_{imgTransform}$.

It should be understood that in the embodiments of the present application, the video processing method 400 and the video processing method 500 may be performed simultaneously. Or the video processing method 400 may be performed at first and then the video processing method 500 may be performed. Or the video processing method 500 may be performed at first and then the video processing method 400 may be performed. The embodiments of the present application do not specifically limit the implementation sequence thereof. The detailed process can refer to the above description and will not be repeated here.

Three-Dimensional Effect Generation

Optionally, the optimization process may further include a three-dimensional process.

By obtaining multiple optimized video segments of the first object, the three-dimensional effect of image frames in the multiple optimized video segments is realized through three-dimensional processing. By adding special effects, the three-dimensional processed video presents richer visual effects and visual enjoyment is improved.

Figure 14:
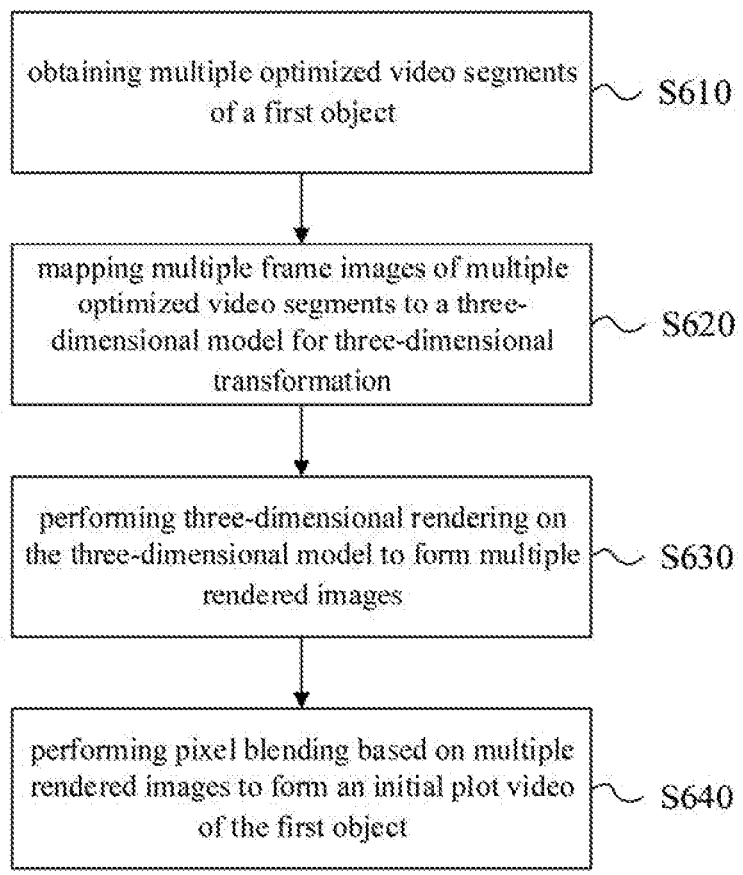
FIG. 14 is a schematic flow chart of another video processing method according to an embodiment of the present application.

FIG. 14 shows a schematic flow chart of another video processing method 600 according to an embodiment of the present application.

As shown in FIG. 14, the video processing method 600 comprises steps S610-S640.

At step S610, multiple optimized video segments of a first object are obtained.

Preferably, the multiple optimized video segments can be N or M optimized video segments obtained by optimizing the above N or M plot video segments. The N or M optimized video segments can be obtained by optimizing each of the N or M plot video segments can be according to the video processing method 300 and/or the video processing method 400 and/or the video processing method 500.

It should be understood that the multiple optimized video segments can also be the above N or M plot video segments without subject to optimization processing, on which no limitation is made in the embodiments of the present application.

It should also be understood that the above-mentioned plot video segment may be only a first plot video segment in the first video, or may be a first plot video segment in a first video and a second plot video segment in a second video, on which no limitation is made in the embodiment of the present application.

At step S620, multiple image frames of multiple optimized video segments are mapped to a three-dimensional model for three-dimensional transformation.

Specifically, illustration is given by taking a three-dimensional transformation of one image frame as an example. An image frame is mapped onto a three-dimensional model as a texture map, and the vertexes of the three-dimensional model correspond to the UV coordinates of the image, which contains pixel information in the image. The vertex coordinates of the three-dimensional model are transformed to realize the three-dimensional transformation effect of the image frame, for example, transformation in a depth direction, flipping in three-dimensional space, etc.

Figure 15:
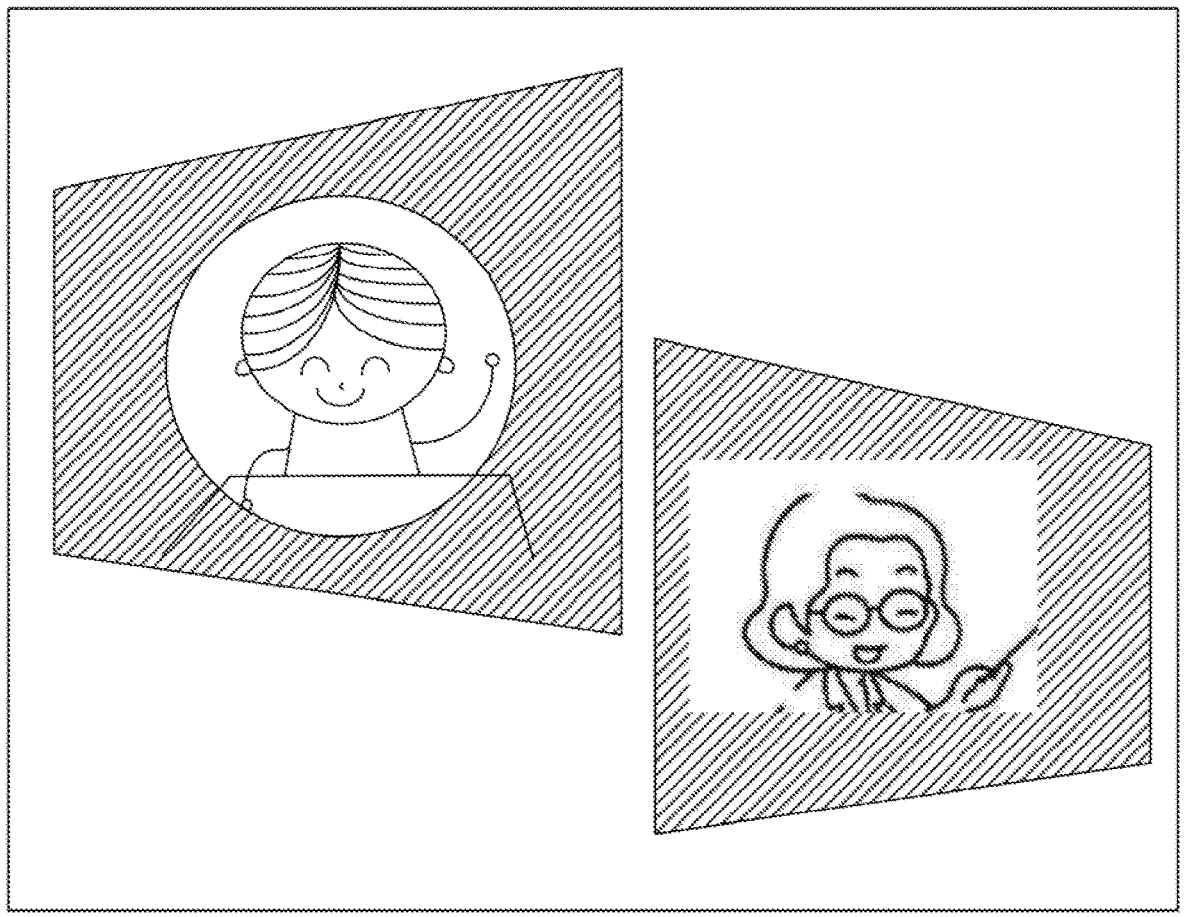
FIG. 15 is a schematic diagram of three-dimensional transformation in optimization processing according to an embodiment of the present application.

As shown in FIG. 15, the figure shows a three-dimensional effect image in which transformation is made in the depth direction. The vertex coordinates in the depth direction of the three-dimensional model are changed, and the image can follow the transformation in the depth direction of the three-dimensional model. By adding this effect, the visual senses of the viewer can be enriched.

It should be understood that in the embodiments of the present application, any three-dimensional effect can be realized through three-dimensional transformation. In the embodiments of the present application, no limitation is specifically made on any specific three-dimensional transformation mode and three-dimensional effect.

At step S630, three-dimensional rendering is performed on the three-dimensional model to form multiple rendered images.

Specifically, after the three-dimensional transformation of the three-dimensional model, the vertex coordinates of the three-dimensional model are converted into screen coordinates, and the information such as depth values and coloring of each vertex is calculated.

Then, rasterization processing is performed, and each pixel point of the screen is operated to draw an image according to the two-dimensional vertex data in the screen space, and the image is a rendered image formed after three-dimensional rendering.

At step S640, pixel blending is performed based on multiple rendered images to form an initial plot video of the first object.

Optionally, the method of pixel blending includes various methods for mixing pixels in the rendered image with pixel values of other images to achieve different image effects.

For example, pixel blending can be performed on two or more adjacent rendered images by pixel transparent blending (Alpha Blending) to realize transition effects such as fade-in/fade-out, aliasing, etc.

For a further example, pixel blending can be performed on a special effect map and the rendered image to form an image including special effect and rendered image information, thus realizing richer special effects.

Then, multiple optimized video segments obtained after pixel blending are synthesized, and the image frames in the synthesized initial plot video have three-dimensional effects and special effects, thus presenting good visual senses.

Optionally, in the embodiments of the present application, the above-mentioned three-dimensional processing process can be performed by executing the shader program in the Frame Buffer of the GPU.

Optionally, the image transformation process of the above three-dimensional processing can be implemented by a transformation module $FBO_{imgTransform}$.

Augmented Reality

Optionally, the optimization processing may further include augmented reality processing.

By obtaining the initial plot video of the first object, the three-dimensional effect of image frames in the initial plot video is realized through three-dimensional processing. By adding special effects, more interactive viewing elements are added to the video after the augmented reality processing, and visual enjoyment is improved.

Figure 16:
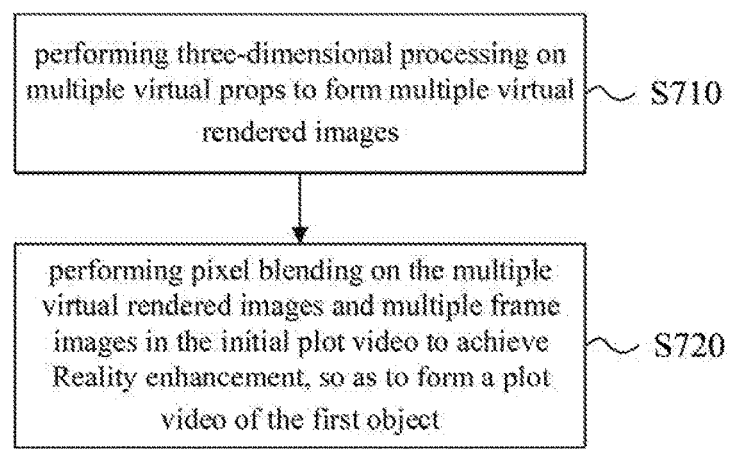
FIG. 16 is a schematic flow chart of another video processing method according to an embodiment of the present application.

FIG. 16 shows a schematic flow chart of another video processing method 700 according to an embodiment of the present application.

As shown in FIG. 16, the video processing method 700 comprises steps S710-S720.

At step S710, three-dimensional processing is performed on multiple virtual props to form multiple virtual rendered images.

Specifically, the virtual prop is a virtual prop/emoji rendered off-line or real-time based on Augmented Reality (AR) technology. The virtual prop can be superimposed on a specific part of the face in real-time. For example, when a student answers a question, a light bulb is superimposed above his/her head. Or after the student answers, a clapping or crown prop is superimposed above his/her head and the like.

Optionally, the multiple virtual props can be multiple prop images supporting Alpha channels, and the multiple virtual props can be used to form dynamic textures.

Optionally, the multiple virtual props can also be multiple images in which Alpha channels and RGB channels are pixel-superimposed in the up-down or left-right directions, and the combination of the multiple images can also form dynamic textures.

Specifically, multiple virtual props are subjected to three-dimensional processing according to camera parameters and multiple feature coordinate points, wherein the parameters of the camera are internal and external parameters of camera obtained by camera calibration for optimizing perspective-n-point (PnP) problem. Optionally, in the embodiments of the application, a non-linear least squares algorithm (Levenberg Marquardt) algorithm is adopted to optimize the PnP problem to obtain the internal and external parameters of a camera.

The multiple feature coordinate points are landmarks obtained by performing face detection, by MTCNN, on multiple lens-optimized video segments or multiple face-optimized video segments or multiple optimized video segments or image frames in an initial plot video.

In the embodiments of the present application, the MTCNN is an MTCNN model obtained based on migration training, which can be used to output coordinate points of 68 features, and thus coordinate points of the five senses organs on a face can be obtained more accurately.

At step S720, pixel blending is performed on the multiple virtual rendered images and multiple image frames in the initial plot video to achieve augmented reality, and thus a plot video of the first object is obtained.

Figure 17:
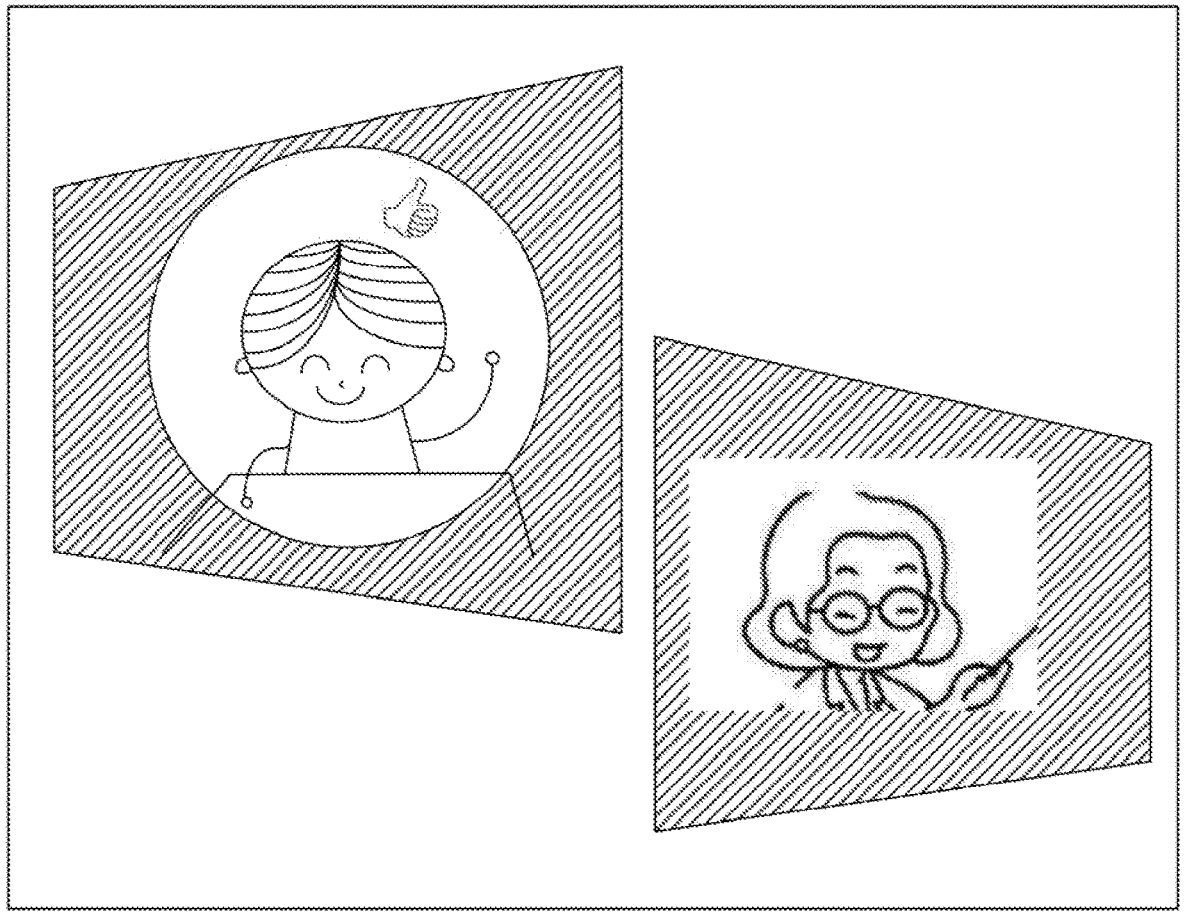
FIG. 17 is a schematic diagram of augmented reality in optimization processing according to an embodiment of the present application.

FIG. 17 shows an image after augmented reality processing. As shown in FIG. 17, the virtual prop image is superimposed and displayed above the student's head. The position of the virtual prop image follows the position of the student's face and can be adjusted and changed according to the student's performance to further improve the experience of the viewer.

Hereinbefore, methods for video processing according to the embodiments of the present application have been described in detail with reference to FIGS. 2 to 17. Hereinafter, devices for video processing according to the embodiments of the present application will be described in detail with reference to FIGS. 18 to 24. It should be understood that the embodiments of the devices correspond to the embodiments of the methods, and a similar description may refer to the embodiments of the methods.

Figure 18:
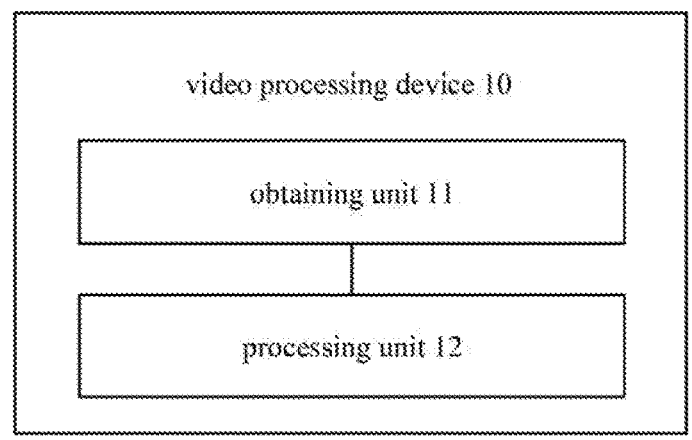
FIG. 18 is a schematic block diagram of a video processing device according to an embodiment of the present application.

FIG. 18 is a schematic block diagram of a video processing device 10 according to an embodiment of the present application. Optionally, the video processing device 10 may correspond to the video processing method 100.

As shown in FIG. 18, the video processing device 10 includes an obtaining unit 11 and a processing unit 12.

The obtaining unit 11 is configured to obtain a first video including multiple human body objects.

The processing unit 12 is configured to determine a detection region of a first object among the multiple human body objects according to at least one image frame in the first video, and to perform human behavior feature detection on the detection region of the first object in the first video to obtain a first plot video segment of the first object in the first video.

Optionally, the video processing device 10 may be the electronic equipment 1 in FIG. 1 or a processor in the electronic equipment 1, including, for example, a CPU and/or a GPU, and the obtaining unit 11 and the processing unit 21 may be constituent units of the processor in the electronic equipment 1.

Optionally, the obtaining unit 11 is further configured to obtain a second video including a second object. The processing unit is further configured to obtain a second plot video segment in the second video within the same period as that of the first plot video segment. Therein the first plot video segment and/or the second plot video segment are used for synthesizing a plot video of the first object.

Figure 19:
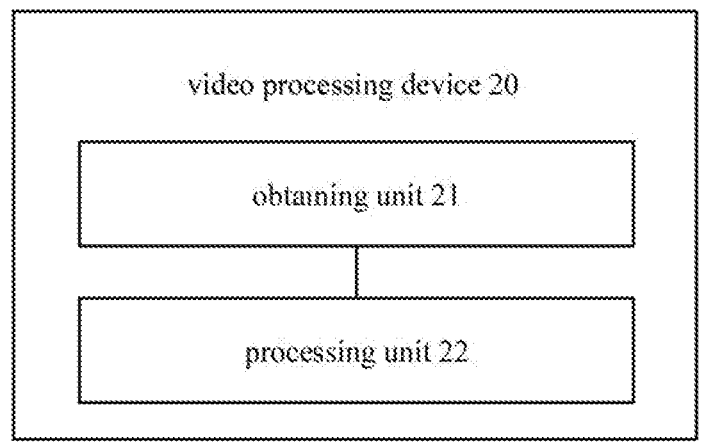
FIG. 19 is a schematic block diagram of another video processing device according to an embodiment of the present application.

FIG. 19 is a schematic block diagram of a video processing device 20 according to an embodiment of the present application. Optionally, the video processing device 20 may correspond to the video processing method 200.

As shown in FIG. 19, the video processing device 20 includes an obtaining unit 21 and a processing unit 22.

Optionally, the obtaining unit 21 may be the same as the obtaining unit 11 in FIG. 18. The processing unit 22 may be the same as the processing unit 12 in FIG. 18.

Optionally, the processing unit 22 is configured to perform detection on the at least one image frame by an object detection algorithm and/or a face detection algorithm to obtain human body position coordinates of the first object in the at least one image frame and determine a detection region of the first object according to the human body position coordinates.

Optionally, the processing unit 22 is configured to determine the detection region of the first object according to the human body position coordinates and first reference coordinates.

Therein the first reference coordinates are coordinates of a first reference article corresponding to the first object.

Optionally, the obtaining unit 21 is further configured to obtain a reference image, including multiple reference articles corresponding to the multiple human body objects, wherein the first object corresponds to a first reference article among the multiple reference articles.

The processing unit 22 is configured to perform detection on the reference image by an object detection algorithm to determine the first reference coordinates of the first reference article and determine the detection region of the first object according to the human body position coordinates and the first reference coordinates.

Optionally, the processing unit 22 is configured to perform facial expression detection and/or human body posture detection on the detection region of the first object of the first video to obtain a first plot video segment of the first object, wherein the first plot video segment includes an object expression and/or an object posture.

Optionally, the object expression includes laughter, and/or the object gesture includes raising hands and standing up.

Optionally, the processing unit 22 is further configured to set weights on the obtained N first plot video segments, where N is a positive integer greater than 1.

According to the weights of the N first plot video segments, M first plot video segments are selected from the N first plot video segments, and are used to form a plot video of the first object, wherein $1 \leq M \leq N$ and M is a positive integer.

Optionally, the weight include a confidence weight $W_1$, a semantic weight $W_2$, a balance weight $W_3$, and an additional weight $W_4$.

The calculation method of the weight W is $W=W_1+W_2 \times W_3+W_4$.

Optionally, the M first plot video segments are the M video segments with the highest weights among the N first plot video segments.

Optionally, the first video is a classroom video including multiple students, and the first object is a student; the second video is a classroom video including a teacher, and the second object is the teacher.

Figure 20:
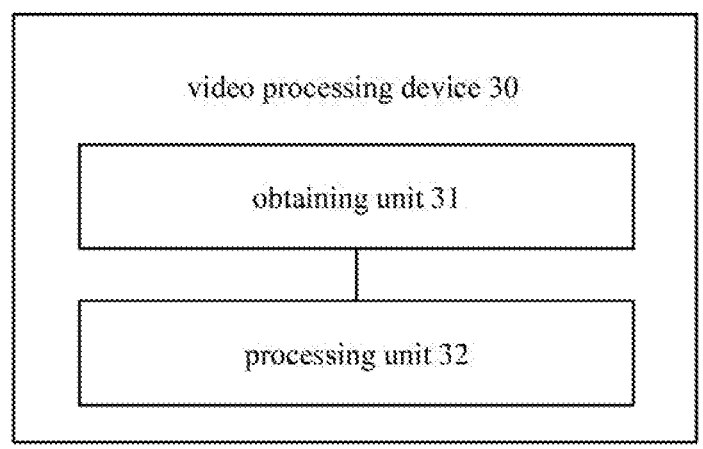
FIG. 20 is a schematic block diagram of another video processing device according to an embodiment of the present application.

FIG. 20 is a schematic block diagram of a video processing device 30 according to an embodiment of the present application. Optionally, the video processing device 30 may correspond to the video processing method 300.

As shown in FIG. 20, the video processing device 30 includes an obtaining unit 31 and a processing unit 32.

Optionally, the obtaining unit 31 may be the same as obtaining unit 11 in FIG. 18, and the processing unit 32 may be the same as the processing unit 12 in FIG. 18.

Optionally, the processing unit 32 is configured to perform face detection on plot video segment to determine an optimization processing mode of the plot video segment, wherein the plot video segment includes the first plot video segment and the second plot video segment; and to perform optimization process on the plot video segment to obtain an optimized video segment of the first object, according to the optimization processing mode, wherein the optimized video segment is used for forming a plot video of the first object.

Optionally, the processing unit 32 includes a shader module for performing image optimization processing on the plot video segment.

Therein, the shader module includes multiple processing modules, and different processing modules are used for performing different types of image optimization process.

Optionally, the shader module further includes a display module for displaying the plot video of the first object in real-time.

Optionally, the count of the multiple processing modules is within a first threshold, and the multiple processing modules are maintained based on a pool maintenance mode.

Optionally, the optimization process includes image transformation, and the processing unit 32 is configured to: perform face fine-detection on a feature region including a face region in the plot video segment to determine an image transformation mode for multiple specific image frames in the plot video segment; perform image transformation on the multiple specific image frames according to the image transformation mode to simulate lens movement, to form lens-optimized video segment of the first object, wherein the lens-optimized video segment of the first object is used to form the optimized video segment of the first object.

Optionally, the multiple specific image frames are images selected in the plot video segment at a specific frame rate, wherein the specific frame rate is less than an average frame rate of the plot video segment.

Optionally, a feature region in the first plot video segment is a preset region, and a feature region in the second plot video is a region determined by face rough-detection.

Optionally, the specific frame rate is less than an average frame rate of the plot video segment and less than a rough-detection rate of the face rough-detection.

Optionally, the processing unit 32 is configured to perform face fine-detection on the feature region in the plot video segment in multiple detection periods, wherein the detection periods are detection periods for face rough-detection.

Optionally, the processing unit 32 is configured to: perform face fine-detection on a feature region in the plot video segment in each of multiple detection periods by a face detection algorithm, to obtain an accumulated value of face number and an accumulated value of face coordinates in the detection period; for each of multiple detection periods, determine a scaling ratio of the specific image frame in the detection period based on the ratio of the accumulation value of face number to the frame rate of the detection period; for each of multiple detection periods, determine a moving distance of the specific image frame in the detection period based on the ratio of the accumulated value of face coordinates to the accumulated value of face number of the detection period.

Optionally, the processing unit 32 is configured to perform image transformation on the multiple specific image frames according to the scaling ratio and the moving distance of the multi specific image frames to obtain a lens-optimized video segment of the first object.

Optionally, a motion trajectory of each image frame in the lens-optimized video segments of the first object is fitted by an easing function.

Optionally, the easing duration of the easing function is determined according to the specific frame rate.

Figure 21:
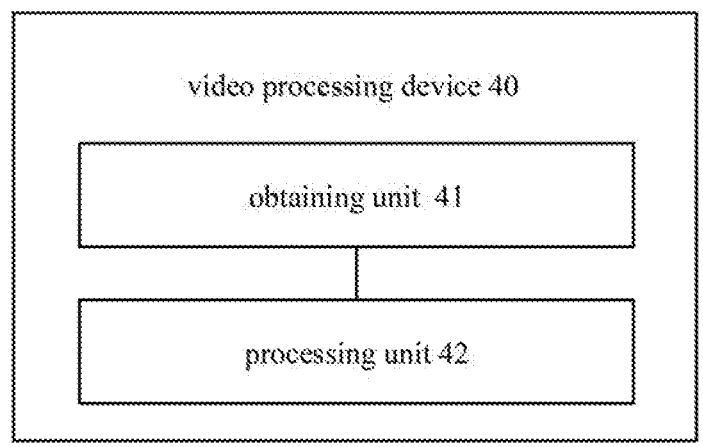
FIG. 21 is a schematic block diagram of another video processing device according to an embodiment of the present application.

FIG. 21 is a schematic block diagram of a video processing device 40 according to an embodiment of the present application. Optionally, the video processing device 40 may correspond to the video processing method 400.

As shown in FIG. 21, the video processing device 40 includes an obtaining unit 41 and a processing unit 42;

Optionally, the obtaining unit 41 may be the same as the obtaining unit 11 in FIG. 18. The processing unit 42 may be the same as the processing unit 12 in FIG. 18.

Optionally, the optimization process further includes face image processing, and the processing unit 42 is configured to: perform face image processing on the lens-optimized video segment to highlight faces and form an optimized video segment of the first object.

Optionally, the face image processing includes super-resolution reconstruction, and the processing unit 42 is configured to perform super-resolution reconstruction on a face region in the lens-optimized video segment to obtain multiple super-resolution face region images, wherein the face region is a face region obtained based on the face fine-detection.

Optionally, the face image processing further includes image blurring processing, and the processing unit 42 is configured to: perform image blurring process on the lens-optimized video segment to obtain multiple background images; perform pixel mixing on the multiple super-resolution face region images and the multiple background images to form face optimized video segment of the first object; wherein the face optimized video segment of the first object is used to form an optimized video segment of the first object.

Optionally, the image blurring process includes image mean blurring, and the pixel blending includes pixel transparent blending.

Figure 22:
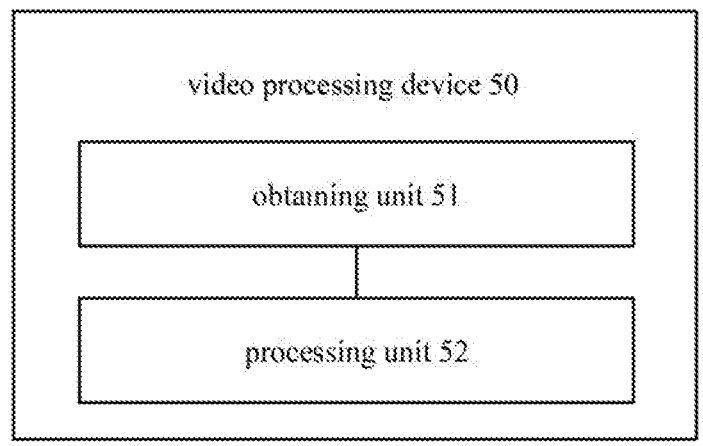
FIG. 22 is a schematic block diagram of another video processing device according to an embodiment of the present application.

FIG. 22 is a schematic block diagram of a video processing device 50 according to an embodiment of the present application. Optionally, the video processing device 50 may correspond to the video processing method 500.

As shown in FIG. 22, the video processing device 50 includes an obtaining unit 51 and a processing unit 52.

Optionally, the obtaining unit 51 may be the same as the obtaining unit 11 in FIG. 18. The processing unit 52 may be the same as the processing unit 12 in FIG. 18.

Optionally, the face image processing further includes light-mapping, and the processing unit 52 is configured to: generate multiple lightmaps according to face regions in the face optimized video segment; perform pixel blending on the multiple lightmaps and the face optimized video segments to form the optimized video segments of the first object.

Optionally, the centers of the multiple lightmaps coincide with the centers of the face regions, the multiple lightmaps are related to the size of the face regions.

Optionally, the motion trajectory of each lightmap in the multiple lightmaps is fitted by an easing function.

Optionally, an easing duration of the easing function of the multiple lightmaps is greater than an easing duration of the easing function of each image frame in the lens-optimized video segment.

Figure 23:
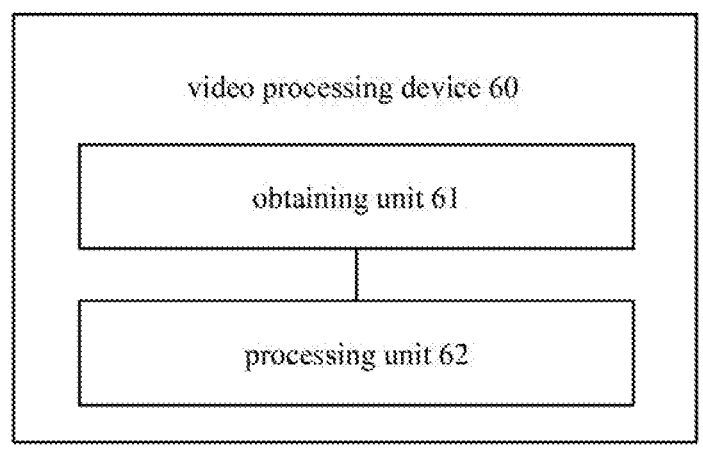
FIG. 23 is a schematic block diagram of another video processing device according to an embodiment of the present application.

FIG. 23 is a schematic block diagram of a video processing device 60 according to an embodiment of the present application. Optionally, the video processing device 60 may correspond to the video processing method 600.

As shown in FIG. 23, the video processing device 60 includes an obtaining unit 61 and a processing unit 62.

Optionally, the obtaining unit 61 may be the same as the obtaining unit 11 in FIG. 18. The processing unit 62 may be the same as the processing unit 12 in FIG. 18.

The optimization process further includes a three-dimensional process, and the processing unit 62 is further configured to perform three-dimensional processing on the obtained multiple optimized video segments to highlight three-dimensional effects, to form an initial plot video of the first object, wherein the initial plot video is used for forming a plot video of the first object.

Optionally, the three-dimensional processing includes three-dimensional transformation, three-dimensional rendering, and pixel blending, and the processing unit is configured to map multiple image frames of multiple optimized video segments to a three-dimensional model for three-dimensional transformation; perform three-dimensional rendering on the three-dimensional model to form multiple rendered images; performing pixel mixing based on the multiple rendered images to form the initial plot video of the first object.

Optionally, the processing unit 62 is configured to perform pixel transparent blending on adjacent images in the multiple rendered images to form transition special effects, and/or performing pixel blending on the multiple special effect images and the multiple rendered images to form composite special effects, to form the initial plot video of the first object.

Figure 24:
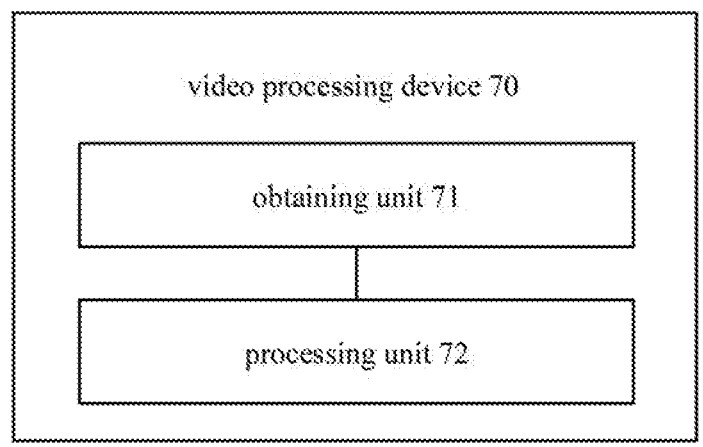
FIG. 24 is a schematic block diagram of another video processing device according to an embodiment of the present application.

FIG. 24 is a schematic block diagram of a video processing device 70 according to an embodiment of the present application. Optionally, the video processing device 70 may correspond to the video processing method 700.

As shown in FIG. 24, the video processing device 70 includes an obtaining unit 71 and a processing unit 72.

Optionally, the obtaining unit 71 may be the same as the obtaining unit 11 in FIG. 18. The processing unit 72 may be the same as the processing unit 12 in FIG. 18.

Optionally, the processing unit 72 is configured to perform three-dimensional processing on multiple virtual prop images to form multiple virtual rendered images; perform pixel mixing on the multiple virtual rendered images and multiple image frames in the initial plot video to achieve augmented reality, to form a plot video of the first object.

Optionally, the processing unit 72 is configured to perform three-dimensional processing on multiple virtual prop images according to camera parameters and multiple feature coordinate points; wherein, the multiple feature coordinate points are multiple landmark coordinates obtained by performing face detection on the multiple lens-optimized video segments by a multi-task convolution neural network MTCNN, and the camera parameters are parameters calculated by optimizing the PnP problem.

Optionally, the MTCNN is used for outputting 68 landmark coordinates, and the MTCNN is a neural network model based on migration training.

Figure 25:
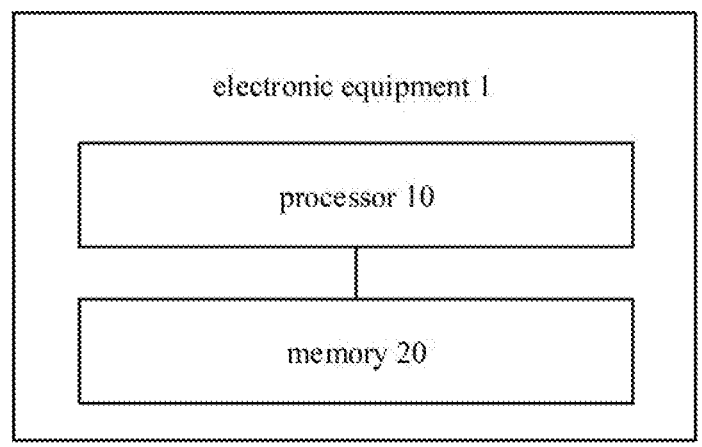
FIG. 25 is a schematic block diagram of electronic equipment according to an embodiment of the present application.

FIG. 25 shows a schematic block diagram of the electronic equipment 1 of the embodiment of the present application.

As shown in FIG. 25, the electronic equipment 1 may include a processor 10 and further may include a memory 20.

It should be understood that the memory 20 is used to store computer-executable instructions.

The memory 20 may be various kinds of memories, such as high-speed Random Access Memory (RAM) and non-volatile memory, such as at least one disk memory. The embodiments of the present application are not limited to this.

The processor 10 is used to access the memory 20 and execute the computer-executable instructions to perform the operations in the video processing method of the embodiment of the present application described above. The processor 10 may include a microprocessor, a Field Programmable Gate Array (FPGA), a Central Processing Unit (CPU), a Graphics Processing unit (GPU), etc., and the embodiments of the present application are not limited thereto.

The video processing device of the embodiment of the present application may correspond to the executing entity of any one of the video processing methods 100 to 700 of the video processing method of the embodiment of the present application, and the above and other operations and/or functions of each module in the video processing device are respectively for realizing the corresponding flow of the above-mentioned methods, and will not be repeated here for brevity.

Optionally, the electronic equipment may further include a camera for capturing video and transmitting the video to the processor 10.

Embodiments of the present application also provide a non-volatile computer storage medium having stored thereon a computer program that, when executed by a computer, causes the computer to perform the method of the above method embodiments.

Embodiments of the present application also provide a computer program product including instructions that, when executed by a computer, cause the computer to perform the method of the above method embodiments.

In the above embodiment, it may be implemented in whole or in part by software, hardware, firmware, or any other combination. When implemented using software, it may be implemented in whole or in part in the form of a computer program product. The computer program product includes one or more computer instructions. When the computer program instructions are loaded and executed on a computer, the processes or functions described in the embodiments of the present application are generated in whole or in part. The computer may be a general-purpose computer, a special purpose computer, a computer network, or other programmable apparatus. The computer instructions may be stored in a computer-readable storage medium or transmitted from one computer-readable storage medium to another, for example, the computer instructions may be transmitted from one web site site, computer, server or data center to another website site, computer, server or data center by wired (e.g., coaxial cable, optical fiber, digital subscriber line (DSL)) or wireless (e.g., infrared, wireless, microwave, etc.). The computer-readable storage medium may be any available medium that a computer can access or a data storage device such as a server, a data center, or the like that includes one or more available media integration. The usable medium may be a magnetic medium (e.g., floppy disk, hard disk, magnetic tape), an optical medium (e.g., digital video disc (DVD)), or a semiconductor medium (e.g., solid-state disk (SSD)) or the like.

Those of ordinary skill in the art will recognize that the elements and algorithm steps of the examples described in connection with the embodiments disclosed herein can be implemented in electronic hardware or a combination of computer software and electronic hardware. Whether these functions are implemented in hardware or software depends on the specific application and design constraints of the technical scheme. Those of ordinary skill in the art may use different methods to implement the described functions for each particular application, but such implementation should not be considered beyond the scope of the present application.

In several embodiments provided in the present application, it should be understood that the disclosed systems, devices and methods may be implemented in other ways. For example, the device embodiments described above are only schematic. For example, the division of the units is only a logic function division. In actual implementation, there may be other division methods, for example, multiple units or components may be combined or integrated into another system, or some features may be ignored or not implemented. On the other hand, the mutual coupling or direct coupling or communication connection shown or discussed may be indirect coupling or communication connection through some interfaces, devices or units, and maybe in electrical, mechanical or other forms.

The units described as separate circuit s may or may not be physically separated, and the units displayed as circuits may or may not be physical circuits, i.e., may be located in one place or may be distributed over multiple network units. Some or all of the circuits can be selected according to actual needs to achieve the purpose of this embodiment.

In addition, each functional unit in each embodiment of the present application may be integrated into one processing unit, each unit may exist physically separately, or two or more units may be integrated into one unit.

The above description is only a specific embodiment of the present application, but the scope of protection of the present application is not limited to this. Any person familiar with the technical field can easily think of changes or substitutions within the technical scope disclosed in the present application and should be covered within the scope of protection of the present application. Therefore, the scope of protection of the present application shall be subject to the scope of protection of the said claims.

What is claimed is:

1. A video processing method, comprising:
obtaining a first video including multiple human body objects;
determining a detection region of a first object among the multiple human body objects according to at least one image frame of the first video; and
performing human behavior feature detection on the detection region of the first object in the first video to obtain N first plot video segments of the first object in the first video, wherein N is a positive integer greater than 1;
setting weights on the obtained N first plot video segments;
selecting M first plot video segments from the N plot video segments according to the weights of the N first plot video segments, wherein 1≤M≤N and M is a positive integer;
forming a plot video of the first object from the M first plot video segments,
wherein the weights comprise a confidence weight $W_1$ a semantic weight $W_2$ a balance weight $W_3$, and an additional weight $W_4$, and the calculation method of the weight W is: $W=W_1+W_2 \times W_3+W_4$,
wherein the M first plot video segments are the M video segments with the highest weights among the N first plot video segments.

2. The method of claim 1, wherein said determining a detection region of a first object among the multiple human body objects according to at least one image frame of the first video, further comprises:
performing detection on the at least one image frame by an object detection algorithm and/or a face detection algorithm, to obtain human body position coordinates of the first object in the at least one image frame; and
determining the detection region of the first object according to the human body position coordinates and first reference coordinates;
wherein the first reference coordinates are coordinates of a first reference article corresponding to the first object.

3. The method of claim 2, wherein said determining the detection region of the first object according to the human body position coordinates and first reference coordinates, further comprises:
obtaining a reference image including multiple reference articles corresponding to the multiple human body objects, wherein the first object corresponds to the first reference article among the multiple reference articles;
performing detection on the reference image by an object detection algorithm, to determine the first reference coordinates of the first reference article; and
determining the detection region of the first object according to the human body position coordinates and the first reference coordinates.

4. The method of claim 1, further comprising:
obtaining a second video including a second object; and
obtaining a second plot video segment in the second video within the same period as that of the first plot video segment;
wherein the first plot video segment and/or the second plot video segment are/is used for synthesizing a plot video of the first object.

5. The method of claim 4, further comprising:
performing face detection on a plot video segment to determine an optimization processing mode of the plot video segment, wherein the plot video segment comprises the first plot video segment and the second plot video segment;
performing optimization process on the plot video segment to obtain an optimized video segment of the first object, according to the optimization processing mode, wherein the optimized video segment is used for forming the plot video of the first object.

6. The method of claim 5, wherein said performing optimization processing on the plot video segment further comprises:
performing, by a shader module, image optimization process on the plot video segment;
wherein the shader module comprises multiple processing modules, and one processing module is used for performing a type of image optimization process, wherein the multiple processing modules are maintained in a pool maintenance mode.

7. The method of claim 5, wherein the first plot video segment comprises multiple first plot video segments, and the optimized video segment comprises multiple video segments,
wherein the optimization process further comprises a three-dimensional process, the method further comprises:
performing three-dimensional processing on the obtained multiple optimized video segments to highlight three-dimensional effects, so as to form an initial plot video of the first object, wherein the initial plot video is used for forming the plot video of the first object;
wherein the three-dimensional processing comprises three-dimensional transformation, three-dimensional rendering, and pixel blending.

8. The method of claim 7, wherein said performing three-dimensional processing on the obtained multiple optimized video segments comprises:
mapping multiple image frames of multiple optimized video segments to a three-dimensional model for three-dimensional transformation;
performing three-dimensional rendering on the three-dimensional model to form multiple rendered images;
performing pixel transparent blending on adjacent images in the multiple rendered images to form transition special effects, and/or performing pixel blending on the multiple special effect images and the multiple rendered images to form composite special effects, so as to form the initial plot video of the first object.

9. The method of claim 7, further comprising:
performing three-dimensional processing on multiple virtual prop images according to camera parameters and coordinate points of multiple features, to form multiple virtual rendered images;
performing pixel blending on the multiple virtual rendered images and multiple image frames in the initial plot video to achieve augmented reality, so as to form the plot video of the first object;
wherein the coordinate points of multiple features are multiple landmark coordinates obtained by performing face detection on the multiple lens-optimized video segments by adopting a multi-task convolution neural network MTCNN, the camera parameters are parameters calculated by optimizing PnP problems, and the MTCNN is a neural network model obtained based on migration training.

10. The method of claim 5, wherein the optimization process comprises image transformation, said performing face detection on the plot video segment to determine an optimization processing mode of the plot video segment further comprises:
performing face fine-detection on a feature region including a face region in the plot video segment to determine image transformation modes for multiple specific image frames in the plot video segment;
said performing optimization process on the plot video segment to obtain an optimized video segment of the first object according to the optimization processing mode further comprises:
performing image transformation on the multiple specific image frames according to the image transformation modes to simulate lens movement, to form a lens-optimized video segment of the first object;
wherein the lens-optimized video segment of the first object is used to form the optimized video segment of the first object, and the multiple specific image frames are images selected at a specific frame rate, wherein the specific frame rate is less than an average frame rate of the plot video segment.

11. The method of claim 10, wherein the feature region in the first plot video segment is a preset region, and the feature region in the second plot video is a region determined by face rough-detection, wherein the specific frame rate is less than the average frame rate of the plot video segment and greater than a rough-detection rate of the face rough-detection;
wherein said performing face fine-detection on the feature region further comprises:
in each of multiple detection periods, performing face fine-detection on the feature region in the plot video segment, wherein the detection period is a detection period for face rough-detection.

12. The method of claim 11, wherein said performing face fine-detection on the feature region in the plot video segment in each of multiple detection periods to determine an image transformation mode for multiple specific image frames in the plot video segment, further comprises: for each of multiple detection periods,
performing, by a face detection algorithm, face fine-detection on the feature region of the specific image frames in the detection period in the plot video segment, to obtain an accumulated value of face number and an accumulated value of face coordinates in the specific image frames in the detection period;
determining a scaling ratio of the specific image frames in the detection period based on the ratio of the accumulation value of face number in the specific image frames in the detection period to the specific frame rate;
determining a moving distance of the specific image frames in the detection period based on the ratio of the accumulated value of face coordinates to the accumulated value of face number in the specific image frames in the detection period.

13. The method of claim 12, wherein said performing image transformation on the multiple specific image frames according to the image transformation modes to obtain lens-optimized video segment of the first object, further comprises:
for each of multiple detection periods, performing image transformation on the specific image frames in the detection period according to the scaling ratios and moving distances of the specific image frames in the detection period, so as to obtain the lens-optimized video segment of the first object.

14. The method of claim 10, further comprising:
fitting, by an easing function, a motion trajectory of each image frame in the lens-optimized video segment of the first object, wherein an easing duration of the easing function is determined according to the specific frame rate.

15. The method of claim 14, further comprising:
generating multiple lightmaps according to the face regions in the face optimization video segment;
fitting the motion trajectory of each lightmap in the multiple lightmaps by adopting an easing function;
performing pixel blending on the multiple lightmaps and the face-optimized video segment to form the optimized video segment of the first object,
wherein the centers of the multiple lightmaps coincide with the centers of the face regions, the multiple lightmaps are related to the size of the face regions, and an easing duration of the easing function of the multiple lightmaps is greater than an easing duration of the easing function of each image frame in the lens-optimized video segment.

16. The method of claim 10, further comprising:
performing super-resolution reconstruction on the face region in the lens-optimized video segment to obtain multiple super-resolution face region images, wherein the face region is a face region obtained based on the face fine-detection, and the multiple super-resolution face region images are used to form a face-optimized video segment of the first object.

17. The method of claim 16, further comprising:
performing image blurring process on the lens-optimized video segment to obtain multiple background images;
performing pixel blending on the multiple super-resolution face region images and the multiple background images to form the face-optimized video segment of the first object;
wherein the face-optimized video segment of the first object is used to form the optimized video segment of the first object.

18. An electronic equipment comprising a memory for storing program code and a processor for calling the program code to perform the method according to claim 1.

19. A non-volatile computer-readable storage medium for storing program code for performing the method according to claim 1.

* * * * *